(12) United States Patent
Imai et al.

(10) Patent No.: US 10,625,592 B2
(45) Date of Patent: Apr. 21, 2020

(54) CONTROL APPARATUS FOR VEHICULAR POWER TRANSMITTING SYSTEM

(71) Applicant: TOYOTA JIDOSHA KABUSHIKI KAISHA, Toyota-shi, Aichi (JP)

(72) Inventors: Keita Imai, Toyota (JP); Koichi Okuda, Okazaki (JP); Tatsuya Imamura, Okazaki (JP); Atsushi Tabata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 16/137,724

(22) Filed: Sep. 21, 2018

(65) Prior Publication Data
US 2019/0084404 A1 Mar. 21, 2019

(30) Foreign Application Priority Data
Sep. 21, 2017 (JP) ................................. 2017-181645

(51) Int. Cl.
*B60K 6/445* (2007.10)
*B60K 6/365* (2007.10)
(Continued)

(52) U.S. Cl.
CPC ............. *B60K 6/445* (2013.01); *B60K 6/365* (2013.01); *B60K 6/547* (2013.01); *B60W 10/06* (2013.01); *B60W 10/08* (2013.01); *B60W 10/115* (2013.01); *B60W 30/18036* (2013.01); *F16H 3/727* (2013.01); *B60K 6/387* (2013.01); *B60K 6/543* (2013.01); *B60K 2006/381* (2013.01); *B60W 20/20* (2013.01); *B60W 20/30* (2013.01); *B60W 20/40* (2013.01); *F16H 2200/0082* (2013.01); *F16H 2200/201* (2013.01); *F16H 2200/2038* (2013.01); *F16H 2200/2097* (2013.01)

(58) Field of Classification Search
None
See application file for complete search history.

(56) References Cited

U.S. PATENT DOCUMENTS 6,409,623 B1 * 6/2002 Hoshiya ................. B60K 6/365
475/5
6,863,633 B2 * 3/2005 Misu ...................... B60K 6/365
475/5
(Continued)

FOREIGN PATENT DOCUMENTS

WO 2013/114594 A1 8/2013

*Primary Examiner* — Timothy Hannon
(74) *Attorney, Agent, or Firm* — Oliff PLC

(57) ABSTRACT

A control apparatus for a vehicular power transmitting system includes a drive mode setting portion configured to select a first reverse drive mode of the vehicle to be established with an engaging action of the first coupling element, and a required vehicle drive force determining portion configured to determine whether a degree of operation of an accelerator pedal of the vehicle during reverse driving of the vehicle is higher than a predetermined threshold value. The drive mode setting portion selects the first reverse drive mode when the required vehicle drive force determining portion has determined that the degree of operation of the accelerator pedal during the reverse driving of the vehicle is higher than the predetermined threshold value.

8 Claims, 27 Drawing Sheets

(51) Int. Cl.
    *B60K 6/547*     (2007.10)
    *B60W 10/08*     (2006.01)
    *B60W 10/06*     (2006.01)
    *B60W 30/18*     (2012.01)
    *F16H 3/72*     (2006.01)
    *B60W 10/115*     (2012.01)
    B60K 6/387     (2007.10)
    B60W 20/20     (2016.01)
    B60K 6/38     (2007.10)
    B60W 20/30     (2016.01)
    B60W 20/40     (2016.01)
    B60K 6/543     (2007.10)

(56) References Cited

U.S. PATENT DOCUMENTS

2015/0021110 A1    1/2015    Ono et al.
2017/0274754 A1    9/2017    Imamura et al.

\* cited by examiner

FIG.3

| DRIVE MODE | | | | | | CL1 | BR1 | CLc | MG1 | MG2 |
|---|---|---|---|---|---|---|---|---|---|---|
| MOTOR DRIVE MODE (EV DRIVE MODE) | FORWARD DRIVE/ REVERSE DRIVE | SINGLE-MOTOR DRIVE | DRIVING | STANDBY SUB-MODES | NORMAL | | | | | M |
| | | | | | O/D INPUT SPLIT | | | ○ | | M |
| | | | | | U/D INPUT SPLIT | ○ | | | | M |
| | | | ASSISTING ENGINE BRAKING | | O/D INPUT SPLIT | | | △ | G | M |
| | | | | | U/D INPUT SPLIT | △ | | | G | M |
| | | TWO-MOTOR DRIVE | | | | ○ | ○ | | M | M |
| ENGINE DRIVE MODE (HV DRIVE MODE) | O/D INPUT SPLIT | FORWARD DRIVE | | | | | | ○ | G | M |
| | | REVERSE DRIVE | FORWARD ENGINE DRIVE FORCE INPUT | | | | | ○ | G | M |
| | U/D INPUT SPLIT | FORWARD DRIVE | | | | ○ | | | G | M |
| | | REVERSE DRIVE | REVERSE ENGINE DRIVE FORCE INPUT | | | | ○ | | G | M |
| | | | FORWARD ENGINE DRIVE FORCE INPUT | | | ○ | | | G | M |
| | FIXED SPEED POSITION | FORWARD DRIVE | DIRECT ENGINE FORCE INPUT | | | ○ | | ○ | | |
| | | | STATIONARY OUTPUT SHAFT | | | | ○ | ○ | G | |

"o": ENGAGED STATE   "△": ONE OR BOTH OF CL1 AND CLc ENGAGED
"G": PRINCIPALLY FUNCTIONING AS GENERATOR
"M": PRINCIPALLY FUNCTIONING AS MOTOR (OR AS GENERATOR AS NEEDED)
BLANK: RELEASED STATE

FIG.34

| DRIVE MODE | | | | | | CL1 | BR1 | CLc | MG1 | MG2 |
|---|---|---|---|---|---|---|---|---|---|---|
| MOTOR DRIVE MODE (EV DRIVE MODE) | FORWARD DRIVE/ REVERSE DRIVE | SINGLE-MOTOR DRIVE | DRIVING | \multicolumn | NORMAL | | | | | M |
| | | | | STANDBY SUB-MODES | O/D INPUT SPLIT | ○ | | | | M |
| | | | | | U/D INPUT SPLIT | | | ○ | | M |
| | | | ASSISTING ENGINE BRAKING | \multicolumn | O/D INPUT SPLIT | △ | | | G | M |
| | | | | \multicolumn | U/D INPUT SPLIT | | | △ | G | M |
| | | TWO-MOTOR DRIVE | | | | ○ | ○ | | M | M |
| ENGINE DRIVE MODE (HV DRIVE MODE) | O/D INPUT SPLIT | FORWARD DRIVE | | | | ○ | | | G | M |
| | | REVERSE DRIVE | REVERSE ENGINE DRIVE FORCE INPUT | | | | ○ | | G | M |
| | | | FORWARD ENGINE DRIVE FORCE INPUT | | | ○ | | | G | M |
| | U/D INPUT SPLIT | FORWARD DRIVE | | | | | | ○ | G | M |
| | | REVERSE DRIVE | FORWARD ENGINE DRIVE FORCE INPUT | | | | | ○ | G | M |
| | FIXED SPEED POSITION | FORWARD DRIVE | DIRECT ENGINE FORCE INPUT | | | ○ | | ○ | | |
| | | | STATIONARY OUTPUT SHAFT | | | | ○ | ○ | G | |

CONTROL APPARATUS FOR VEHICULAR POWER TRANSMITTING SYSTEM

This application claims priority from Japanese Patent Application No. 2017-181645 filed on Sep. 21, 2017, the disclosure of which is herein incorporated by reference in its entirety.

FIELD OF THE INVENTION

The present invention relates to a control apparatus for a vehicle provided with a first differential mechanism to which an engine is operatively connected in a power transmittable manner, a second differential mechanism a differential state of which is controlled by controlling an operating state of a first motor/generator, and a second motor/generator operatively connected in a power transmittable manner to an output rotary member connected to drive wheels.

BACKGROUND OF THE INVENTION

WO-2013/114594A discloses an example of a known vehicular power transmitting system provided with: a power transmitting mechanism through which a rotary motion of an engine is transmitted; a differential mechanism connecting the power transmitting mechanism and drive wheels to each other; and a switching device for shifting the power transmitting mechanism. The differential mechanism includes a first rotary element connected to an output element of the power transmitting mechanism, a second rotary element connected to the first rotary element, and a third rotary element connected to a second electric motor and the drive wheels.

SUMMARY OF THE INVENTION

By the way, the vehicular power transmitting system described above has a plurality of drive modes which are selectively established by controlling operating states of coupling devices such as clutches and brakes incorporated in the switching device. In a reverse drive mode, however, an output torque of the engine acts in a direction of a reverse drive torque for driving a vehicle in its reverse direction, so that there is a problem that the reverse drive torque is limited by the output torque of the engine.

The present invention was made in view of the background art described above. It is therefore an object of the present invention to provide a control apparatus for a vehicular power transmitting system, which permits the vehicle to be driven in the reverse direction with a sufficient amount of the reverse drive torque.

The object indicated above is achieved according to the following modes of the present invention:

According to a first mode of the invention, there is provided a control apparatus for a power transmitting system of a vehicle including: a first differential mechanism having a first rotary element, a second rotary element and a third rotary element; a second differential mechanism having a fourth rotary element, a fifth rotary element and a sixth rotary element; and a first coupling element for connecting the second rotary element and a stationary member to each other, and wherein the first rotary element is connected to an engine, the third rotary element is connected to the sixth rotary element, the fifth rotary element is connected to an output shaft, the fourth rotary element is connected to a first motor/generator, and the output shaft is connected to a second motor/generator, the control apparatus comprising: a drive mode setting portion configured to select a first reverse drive mode of the vehicle to be established in an engaged state of the first coupling element; and a required vehicle drive force determining portion configured to determine whether a degree of operation of an accelerator pedal of the vehicle during reverse driving of the vehicle is higher than a predetermined threshold value. The drive mode setting portion selects the first reverse drive mode when the required vehicle drive force determining portion has determined that the degree of operation of the accelerator pedal during the reverse driving of the vehicle is higher than the predetermined threshold value.

The control apparatus according to the first mode of the invention is configured such that the drive mode setting portion selects the first reverse drive mode when the required vehicle drive force determining portion has determined that the degree of operation of the accelerator pedal is larger than the predetermined value. In this first reverse drive mode, rotary motion of the second rotary element of the first differential mechanism is stopped as a result of the engaging action of the first coupling element, so that the third rotary element of the first differential mechanism is rotated in the reverse direction while the first rotary element of the first differential mechanism is rotated in the forward direction. Accordingly, the rotary motion of the engine input to the first rotary element is reversed, and the reversed rotary motion of the engine is output from the third rotary element. Since this third rotary element is connected to the sixth rotary element of the second differential mechanism, a large reverse drive torque including an output torque of the engine is output from the output shaft connected to the fifth rotary element of the second differential mechanism, when the first motor/generator connected to the fourth rotary element of the second differential mechanism is controlled so as to generate a negative output torque. The large reverse drive force permits easy reverse uphill running of the vehicle.

The degree of operation of the accelerator pedal is preferably represented by at least one of an amount of operation of the acceleration pedal, a rate of change of the amount of operation of the accelerator pedal, and an amount of change of the operation amount of the accelerator pedal.

Preferably, the power transmitting system further includes a second coupling element for connecting any two elements of the first, second and third rotary elements to each other. In this case, the control apparatus further comprises a garage shift operation determining portion configured to determine whether a garage shift operation of a shift lever has been performed to switch a drive mode of the vehicle between forward and reverse drive modes, during running of the vehicle with a drive force of the engine at a running speed lower than a predetermined value while the accelerator pedal is held in its non-operated position. The drive mode setting portion selects a second reverse drive mode of the vehicle to be established in an engaged state of the second coupling element, when the garage shift operation determining portion has determined that the garage shift operation has been performed. Thus, the second reverse drive mode is established in the engaged state of the second coupling element, when the garage shift operation is performed for switching between the forward drive mode and the reverse drive mode, so that the drive mode can be adequately switched with a higher degree of switching smoothness.

The drive mode setting portion is preferably configured to select the second reverse drive mode when the drive mode is switched from the forward drive mode to the reverse drive mode during the running of the vehicle with the drive force of the engine. Accordingly, the drive mode can be easily switched to the reverse drive mode, with a reduced risk of generation of a shifting shock of the power transmitting system.

Preferably, the required vehicle drive force determining portion determines whether the degree of operation of the accelerator pedal or a required drive force of the vehicle obtained on the basis of the degree of operation of the accelerator pedal is larger than a predetermined value, and the drive mode setting portion selects the first reverse drive mode when the required vehicle drive force determining portion has determined that the degree of operation of the accelerator pedal or the required drive force of the vehicle is larger than the predetermined value. In this case, the first reverse drive mode is selected in a running state of the vehicle in which it is considered that there is a high risk of generation of the shifting shock of the power transmitting system.

Preferably, the control apparatus further comprises a hybrid control portion configured to control the engine such that an output torque of the engine is increased after an engaging action of the first coupling element is completed when a reverse drive mode of the vehicle is switched from the second reverse drive mode to the first reverse drive mode by the drive mode setting portion. Accordingly, the risk of generation of the shifting shock of the power transmitting system upon switching of the reverse drive mode from the second reverse drive mode to the first reverse drive mode can be reduced.

Preferably, the drive mode setting portion switches a drive mode of the vehicle from the first reverse drive mode for reverse driving of the vehicle with the drive force of the engine, to a forward drive mode for forward driving of the vehicle with the drive force of the engine, through the second reverse drive mode. Accordingly, the power transmitting system can be easily switched from the reverse drive mode to the forward drive mode, with a reduced risk of generation of the shifting shock of the power transmitting system.

Preferably, the control apparatus further comprises a power transmission switching portion configured to establish the first reverse drive mode selected by the drive mode setting portion. Accordingly, the first reverse drive mode selected by the drive mode setting portion as a result of an increase of the required vehicle drive force for reverse driving of the vehicle is established by the power transmission switching portion, namely, the power transmitting system is switched from a motor drive mode to an engine drive mode while the second motor/generator is kept operated in the reverse direction. Thus, the control apparatus permits smooth transition of the source of the vehicle drive force from the second motor/generator to the engine.

BRIEF DESCRIPTION OF THE DRAWINGS

FIG. 3 is a table indicating the operating states of the coupling elements in different drive sub-modes of the vehicle;

FIG. 34 is a table indicating the operating states of the coupling elements in different drive modes of the vehicular power transmitting system having the gear train B1FR of FIG. 32;

DETAILED DESCRIPTION OF PREFERRED EMBODIMENTS

Preferred embodiments of the present invention will be described in detail by reference to the drawings.

First Embodiment

Figure 1:
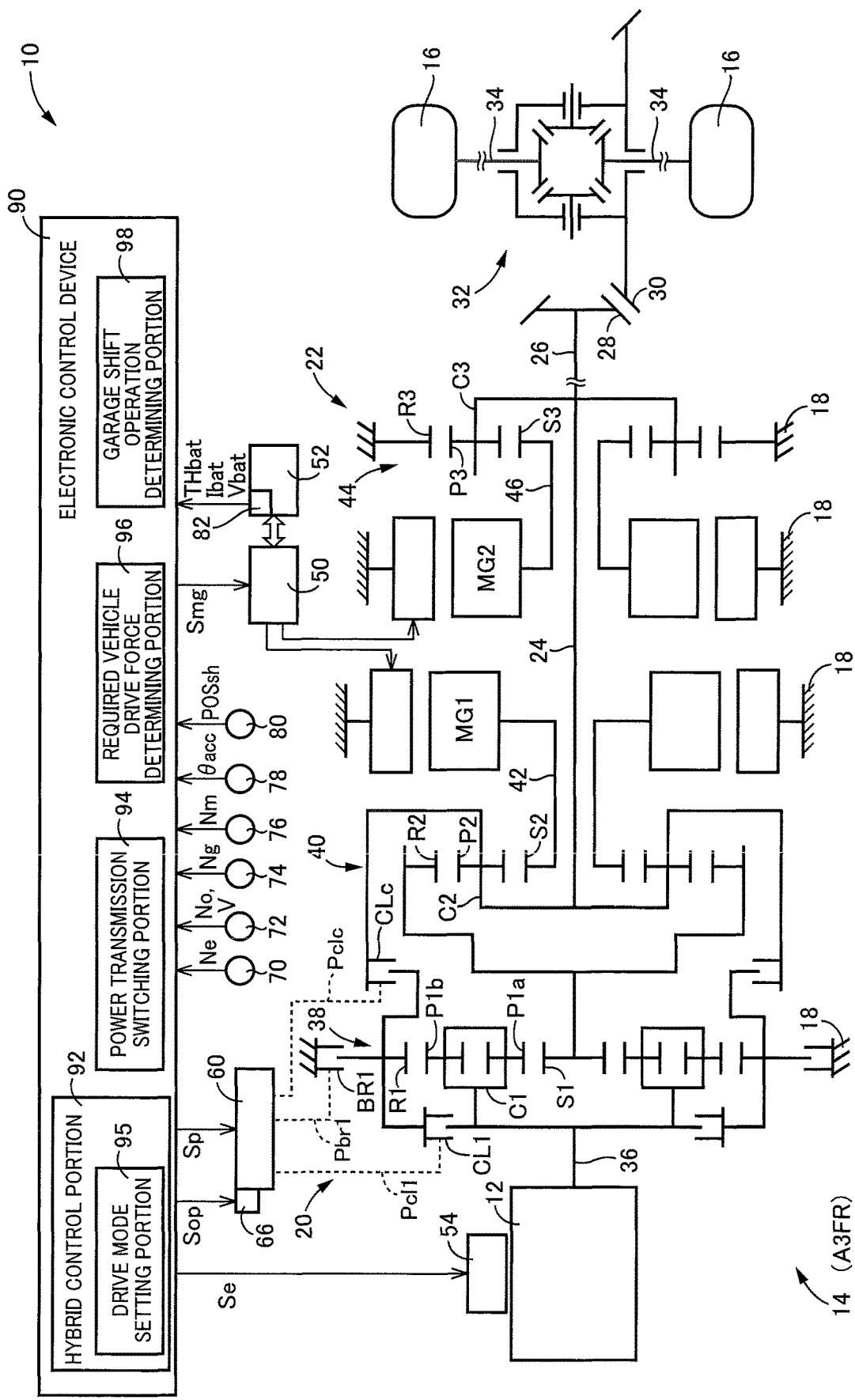
FIG. 1 is a schematic view showing an arrangement of a vehicular power transmitting system having a gear train A3FR according to a first embodiment of this invention, which is controlled by a control apparatus according to the present invention, and major control portions of the control apparatus.

Reference is first made to FIG. 1, which is the schematic view showing an arrangement of a power transmitting system 14 of a vehicle 10 according to a first embodiment of this invention, which has a gear train A3FR and which is controlled by a control apparatus according to the present invention, and major control portions of the control apparatus. As shown in FIG. 1, the vehicle 10 is a hybrid vehicle provided with an engine 12, a first motor/generator MG1, a second motor/generator MG2, the above-indicated power transmitting system (vehicular power transmitting system) 14, and drive wheels 16. The engine 12, first motor/generator MG1 and second motor/generator MG2 may be used as a vehicle drive power source. The power transmitting system 14 of FIG. 1 has the gear train A3FR.

The engine 12 is a known internal combustion engine such as a gasoline engine or a diesel engine, which generates a drive force by combustion of a suitable fuel. The engine 12 is controlled by the control apparatus in the form of an electronic control device 90 described below in detail. Described more specifically, the electronic control device 90 controls a torque Te of the engine 12 (engine torque Te), by controlling its operating state as represented by an angle θ of opening of a throttle valve or an intake air quantity, an amount of injection of the fuel, and an ignition timing.

Each of the first motor/generator MG1 and the second motor/generator MG2 has a function of an electric motor to generate a drive torque and a function of an electric generator. The vehicle 10 is further provided with an electric power control unit 50, and an electric power storage unit in the form of a battery unit 52 to and from which an electric power is supplied. The first motor/generator MG1 and the second motor/generator MG2 are connected to the battery unit 52 through the electric power control unit 50, which has an inverter portion and a smoothing capacitor. The electric power control unit 50 is controlled by the electronic control device 90 to control output torques (vehicle driving torques or regenerative torques) of the first motor/generator MG1 and the second motor/generator MG2, which will be hereinafter referred to as "MG1 torque Tg" and "MG2 torque Tm", respectively.

The gear train A3FR of the power transmitting system 14 is disposed in a power transmitting path between the engine 12 and the drive wheels 16. The gear train A3FR includes the first motor/generator MG1, the second motor/generator MG2, a first power transmitting portion 20 and a second power transmitting portion 22, which are accommodated within a casing 18 which is a stationary member fixed to a body of the vehicle 10. The power transmitting system 14 further includes: a propeller shaft 26 connected to an output shaft 24 which is an output rotary member of the first power transmitting portion 20; a drive pinion 28 connected to the propeller shaft 26; a differential gear device 32 meshing with a drive pinion 28 through a differential ring gear 30; and drive axles 34 connected to the differential gear device 32.

The first power transmitting portion 20 is disposed coaxially with its input rotary member in the form of an input shaft 36 connected to a crankshaft of the engine 12, and includes a first differential mechanism 38, a second differential mechanism 40, the first motor/generator MG1, a first coupling element in the form of a brake BR1, a second coupling element in the form of a clutch CL1, and a third coupling element in the form of a clutch CLc.

The first differential mechanism 38 is a known planetary gear mechanism of a double-pinion type which has: a first sun gear S1; pairs of first pinion gears P1a and P1b meshing with each other; a first carrier C1 supporting the first pinion gears P1a, P1b such that each first pinion gear P1a, P1b is rotatable about its axis and about an axis of the first sun gear S1; and a first ring gear R1 meshing with the first sun gear S1 through the first pinion gears P1a and P1b. The first differential mechanism 38 is operable as a differential mechanism having a differential function, and employs a double-pinion type planetary gear set, so that a gear ratio $\rho 1$ (described below) of the first differential mechanism 38 is adequately set. The second differential mechanism 40 is a known planetary gear mechanism of a single-pinion type which has: a second sun gear S2; a second pinion gear P2; a second carrier C2 supporting the second pinion gear P2 such that the second pinion gear P2 is rotatable about its axis and about an axis of the second sun gear S2; and a second ring gear R2 meshing with the second sun gear S2 through the second pinion gear P2. The second differential mechanism 40 is operable as a differential mechanism having a differential function.

In the first differential mechanism 38, the first carrier C1 is integrally connected to the input shaft 36, and functions as a first rotary element RE1 to which the engine 12 is operatively connected in a power transmittable manner through the input shaft 36 and which functions as an input rotary member of the differential mechanism 38. The first ring gear R1 is a second rotary element RE2 which is selectively connected to the casing 18 through the brake BR1. The first sun gear S1 is a third rotary element RE3 which is connected to an input rotary member (namely, the second ring gear R2) of the second differential mechanism 40, and which functions as an output rotary member of the first differential mechanism 38.

In the second differential mechanism 40, the second sun gear S2 is integrally connected to a rotor shaft 42 of the first motor/generator MG1, and functions as a reaction element which is a fourth rotary element RE4 to which the first motor/generator MG1 is operatively connected in a power transmittable manner. The second carrier C2 is connected to the output shaft 24 such that the second carrier C2 is rotated together with the output shaft 24. The second carrier C2 functions as an output element which is connected to the drive wheels 16, and is a fifth rotary element RE5 functioning as an output rotary member of the second differential mechanism 40. The second ring gear R2 is an input element which is connected to the output rotary member in the form of the first sun gear S1 of the first differential mechanism 38, and which is a sixth rotary element RE6 functioning as the input rotary member of the second differential mechanism 40.

The first carrier C1 and the first ring gear R1 are selectively connected to each other through the clutch CL1, while the first ring gear R1 and the second carrier C2 are selectively connected to each other through the clutch CLc. Thus, the clutch CL1 functions as the second coupling element for selectively connecting the first rotary element RE1 and the second rotary element RE2 to each other, while the clutch CLc functions as the third coupling element for selectively connecting the second rotary element RE2 and the fifth rotary element RE5 to each other. Further, the brake BR1 functions as the first coupling element for selectively connecting the second rotary element RE2 to the casing 18. Each of the clutch CL1, clutch CLc and brake BR1 is preferably a frictional coupling device of a wet-type, and a multiple-disk hydraulically operated frictional coupling device an operating state of which is controlled by a hydraulic actuator.

Figure 2:
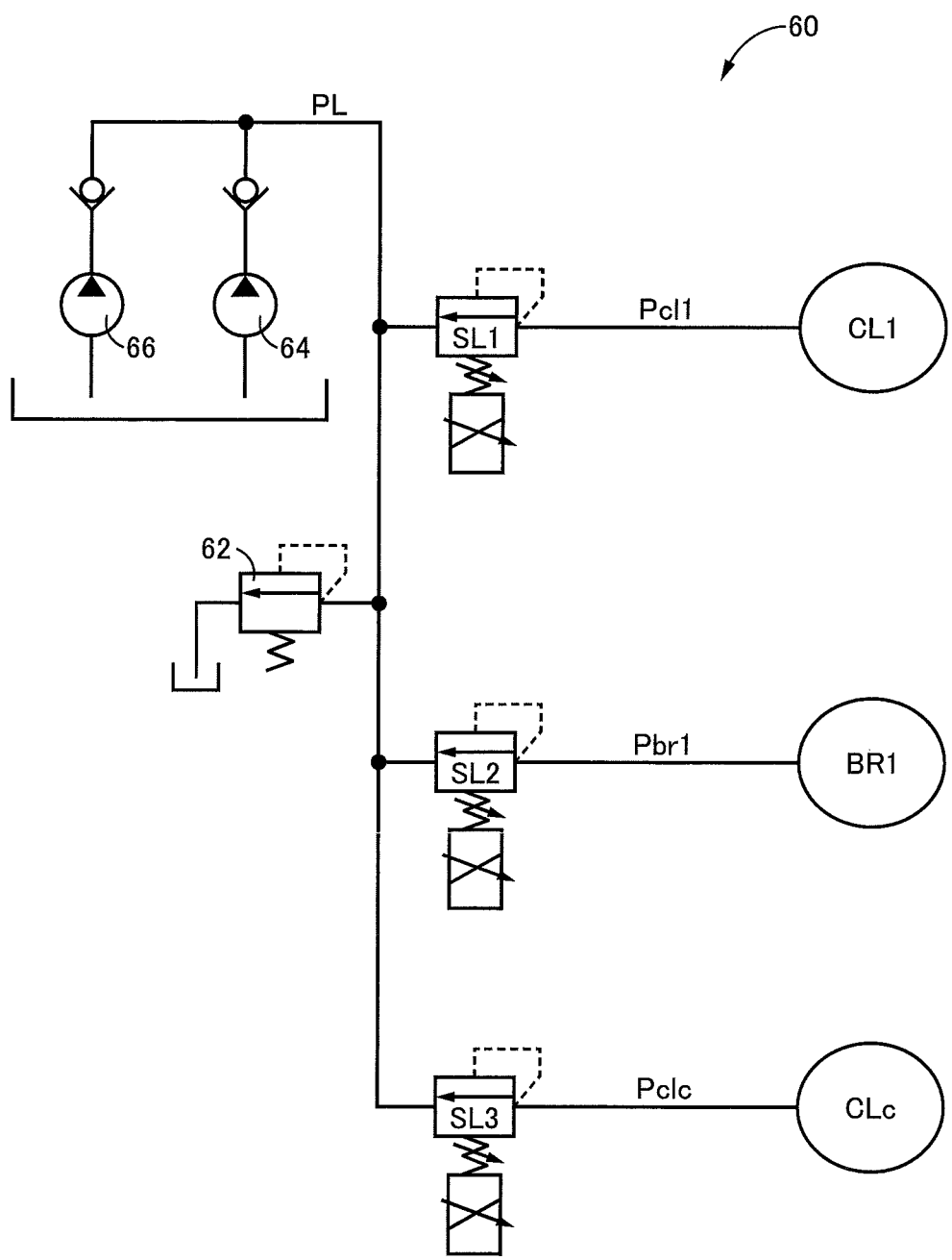
FIG. 2 is a view showing an example of major components of a hydraulic control unit for controlling operating states of coupling elements incorporated in the vehicular power transmitting system.

FIG. 2 is the view showing an example of major components of a hydraulic control unit 60 provided on the vehicle 10, for controlling the operating states (such as engaged state, released state, or the like) of the coupling elements in the form of the clutch CL1, clutch CLc and brake BR1. As shown in FIG. 2, the hydraulic control unit 60 incorporates a primary regulator valve 62, and linear solenoid-operated valves SL1-SL3. The primary regulator valve 62 regulates a line pressure PL by controlling a pressure of a working fluid generated by a mechanically operated oil pump 64 (MOP 64) or an electrically operated oil pump 66 (EOP 66) provided on the vehicle 10. The MOP 64 is connected to a rotary member (element) of the power transmitting system 14, which is rotated while the engine 12 is operated, so that the MOP 64 is operated by the engine 12, to pressurize the working fluid. The EOP 66 is operated by an electric motor (not shown) provided exclusively for the EOP 66, which is operated under the control of the electronic control device 90, to pressurize the working fluid while the engine 12 is held at rest, for instance, in a motor drive mode in which the engine 12 is held at rest. The linear solenoid-operated valve SL1 regulates a pressure of the working fluid applied to the clutch CL1 (CL1 hydraulic pressure Pcl1) by controlling the line pressure PL. The linear solenoid-operated valve SL2 regulates a pressure of the working fluid applied to the brake BR1 (BR1 hydraulic pressure Pbr1) by controlling the line pressure PL. The linear solenoid-operated valve SL3 regulates a pressure of the working fluid applied to the clutch CLc (CLc hydraulic pressure Pclc) by controlling the line pressure PL. The linear solenoid-operated valves SL1-SL3 are basically identical in construction with each other, and are selectively energized or de-energized, or controlled in terms of amounts of electric currents supplied thereto, independently of each other, by the electronic control device 90, so that the hydraulic pressures Pcl1, Pbr1 and Pclc are regulated independently of each other. The coupling elements in the form of the clutch CL1, brake BR1 and clutch CLc are selectively placed in their fully engaged state, fully released state or partially engaged state, according to the respective hydraulic pressures Pcl1, Pbr1 and Pclc applied thereto.

Referring back to FIG. 1, the first differential mechanism 38 can be selectively placed in one of four operating states, with the operating states of the clutch CL1 and the brake BR1 being suitably controlled. The four operating states consist of: a direct-engine-force-input state; an engine-input reversing state; a neutral state; and an internal locking state. Described in detail, the first differential mechanism 38 is placed in the direct-engine-force-input state when the clutch CL1 is placed in its fully engaged state. In this direct-engine-force-input state, all of the rotary elements of the first differential mechanism 38 are rotated as a unit while the first differential mechanism 38 is directly connected to the engine 12. In the fully engaged state of the brake BR1 in which a rotating speed (rpm) of the first ring gear R1 is zeroed, the first differential mechanism 38 is placed in the engine-input reversing state in which the first sun gear S1 (output rotary member of the first differential mechanism 38) is rotated in a negative direction opposite to a positive direction of operation of the engine 12 (having a positive operating speed Ne). In the fully released states of the clutch CL1 and the brake BR1, the first differential mechanism 38 is placed in the neutral state permitting its differential operation. In the fully engaged states of the clutch CL1 and the brake BR1, the first differential mechanism 38 is placed in the internal locking state in which its rotary elements are held stationary.

While the second differential mechanism 40 is permitted to perform its differential operation, the second differential mechanism 40 can function as a power distributing mechanism for distributing (or splitting) the drive force of the engine 12 received by the second ring gear R2, to the first motor/generator MG1 and the second carrier C2. Accordingly, the vehicle 10 can be driven in an engine drive mode in which a reaction force against the engine torque Te received by the second ring gear R2 is received by the first motor/generator MG1. In the engine drive mode, the vehicle 10 can be driven with a torque (directly transmitted engine torque) mechanically transmitted from the engine 12 to the second carrier C2, and the MG2 torque Tm generated by the second motor/generator MG2 which is operated with an electric power generated by the first motor/generator MG1 operated with the drive force distributed thereto. Thus, the second differential mechanism 40 as a known electrically controlled differential portion (electrically controlled continuously variable transmission) a speed ratio of which is controlled with an operating state of the first motor/generator MG1 being controlled by controlling the electric power control unit 50 by the electronic control device 90. Namely, the second differential mechanism 40 is an electrically controlled transmission mechanism a differential state of which is controlled according to the controlled operating state of the first motor/generator MG1.

The first power transmitting portion 20 is operable as an electrically controlled continuously variable transmission a power distributing ratio of which is different from that of the second differential mechanism 40. That is, the first differential mechanism 38 and the second differential mechanism 40 in the first power transmitting portion 20 wherein the first sun gear S1 (third rotary element RE3) and the second ring gear R2 (sixth rotary element REG) are connected to each other, cooperate to constitute one differential mechanism when the first ring gear R1 (second rotary element RE2) and the second carrier C2 (fifth rotary element RE5) are connected to each other in the engaged state of the clutch CLc.

In the first power transmitting portion 20, the first differential mechanism 38 which is selectively placed in one of the above-indicated four operating states, and the second differential mechanism 40 are connected to each other, so that the vehicle 10 can be driven in a plurality of drive modes described below, by controlling the operating states of the clutch CLc as well as the clutch CL1 and the brake BR1.

In the first power transmitting portion 20 configured as described above, the drive force of the engine 12 and the drive force of the first motor/generator MG1 are transmitted to the output shaft 24. That is, the engine 12 and the first motor/generator MG1 are operatively connected to the drive wheels 16 through the first power transmitting portion 20.

The second power transmitting portion 22 is disposed coaxially with the input shaft 36 (output shaft 24), and includes the second motor/generator MG2, and a speed reduction mechanism 44 connected to the output shaft 24. The speed reduction mechanism 44 is a known planetary gear mechanism of a single-pinion type including a third sun gear S3, a third pinion gear P3, and a third carrier C3, and a third ring gear R3 meshing with the third sun gear S3 through the third pinion gear P3. The third carrier C3 supports the third pinion gear P3 such that the third pinion gear P3 is rotatable about its axis and an axis of the third sun gear S3. The third sun gear S3 is an input rotary element connected to a rotor shaft 46 of the second motor/generator MG2. The third ring gear R3 is a reaction rotary element connected to the casing 18. The third carrier C3 is an output element connected to the output shaft 24. In the speed reduction mechanism 44 constructed as described above, a rotary motion of the second motor/generator MG2 is transmitted to the output shaft 24, such that an operating speed Nm of the second motor/generator MG2 is reduced to a rotating speed of the output shaft 24. In the second power transmitting portion 22, a drive force of the second motor/generator MG2 is transmitted to the output shaft 24, without transmission through the first power transmitting portion 20. Thus, the second motor/generator MG2 is operatively connected to the drive wheels 16 in a power transmittable manner, without transmission through the first power transmitting portion 20. Namely, the second motor/generator MG2 is operatively connected in a power transmittable manner to an output rotary member of the power transmitting system 14 in the form of the drive axles 34, without transmission through the first power transmitting portion 20. The output rotary member of the power transmitting system 14 is a rotary member connected to the drive wheels 16. The output shaft 24 and the propeller shaft 26 as well as the drive axles 34 may also be considered as the output rotary member of the power transmitting system 14.

The thus constructed power transmitting system 14 is suitably used for the vehicle 10 of an FR type (front-engine rear-drive type). In this power transmitting system 14, the drive forces of the engine 12, the first motor/generator MG1 and the second motor/generator MG2 are transmitted to the drive wheels 16 through the output shaft 24, the differential gear device 32 and the drive axles 34, in this order of description.

The vehicle 10 is provided with the electronic control device 90 serving as the control apparatus for controlling the engine 12, power transmitting system 14 and other portions of the vehicle 10. The electronic control device 90 includes a so-called microcomputer incorporating a CPU, a RAM, a ROM and an input/output interface. The CPU performs signal processing operations according to control programs stored in the ROM while utilizing a temporary data storage function of the RAM, to implement various controls of the vehicle 10. For instance, the electronic control device 90 implements output controls of the engine 12, first motor/generator MG1 and second motor/generator MG2, and drive mode switching controls of the power transmitting system 14. The electronic control device 90 may consist of separate units including an engine control unit, a motor/generator control unit, and a hydraulic control unit.

The electronic control device 90 is configured to receive output signals of various sensors provided on the vehicle 10, such as: an output signal of an engine speed sensor 70 indicative of the engine speed Ne; an output signal of an output speed sensor 72 indicative of a rotating speed No of the output shaft 24, which corresponds to a running speed V of the vehicle 10; an output signal of an MG1 speed sensor 74 (e.g., a resolver) indicative of an operating speed Ng of the first motor/generator MG1 (MG1 speed Ng); an output signal of an MG2 speed sensor 76 (e.g., a resolver) indicative of the operating speed Nm of the second motor/generator MG2 (MG2 speed Nm); an output signal of an accelerator pedal operation amount sensor 78 indicative of an operation amount θacc of an accelerator pedal; an output signal of a shift position sensor 80 indicative of a presently selected one of operating positions POSsh of a shift lever such as a parking position P, a reverse drive position R, a neutral position N and a forward drive position D; and output signals of a battery sensor 82 indicative of a temperature THbat, a charging/discharging electric current Ibat and a voltage Vbat of the battery unit 52. The electronic control device 90 is further configured to generate output signals to be applied to various devices of the vehicle 10, such as: engine control command signals Se applied to an engine control device 54 to control a throttle actuator, a fuel injecting device, an igniting device and other devices of the engine 12; motor/generator control command signals Smg to be applied to the electric power control unit 50 to control the first motor/generator MG1 and the second motor/generator MG2; hydraulic control command signals Sp to be applied to the hydraulic control unit 60 to control the coupling elements, that is, the clutch CL1, brake BR1 and clutch CLc; and a pump drive control command signal Sop to be applied to the EOP 66 to operate the EOP 66. The electronic control device 90 calculates an amount SOC of the electric power stored in the battery unit 52 as a parameter representative of a charging state of the battery unit 52, on the basis of the charging/discharging electric current Ibat and the voltage Vbat.

To implement various controls of the vehicle 10, the electronic control device 90 includes hybrid control means in the form of a hybrid control portion 92, power transmission switching means in the form of a power transmission switching portion 94, required vehicle drive force determining means in the form of a required vehicle drive force determining portion 96, and garage shift operation determining means in the form of a garage shift operation determining portion 98.

The hybrid control portion 92 is configured to generate the engine control command signals Se for controlling the angle θ of opening of the throttle valve, the amount of injection of the fuel, a timing of the fuel injection, and the ignition timing, to thereby control the output of the engine 12 such that the engine torque Te coincides with a target value. The hybrid control portion 92 is further configured to generate the motor/generator control command signals Smg for controlling the operating states of the first motor/generator MG1 and the second motor/generator MG2. These motor/generator control command signals Smg are applied to the electric power control unit 50 to control the outputs of the first motor/generator MG1 and the second motor/generator MG2 such that the MG1 torque Tg and the MG2 torque Tm coincide with respective target values.

The hybrid control portion 92 is also configured to calculate a required vehicle drive torque on the basis of the accelerator pedal operation amount θacc and the vehicle running speed V, and to generate the engine control command signals Se for controlling an output of the engine 12 so as to obtain a target value of the engine torque Te (calculated required vehicle drive torque), while taking account of a required amount of charging of the battery unit 52, so that the vehicle 10 is driven with a high degree of fuel economy and with a reduced amount of emission of exhaust gases. The hybrid control portion 92 is further configured to apply the motor/generator control command signals Smg to the electric power control unit 50, for controlling operations and outputs of the first motor/generator MG1 and the second motor/generator MG2, so as to obtain target values of the MG1 torque Tg and MG2 torque Tm.

Figure 19:
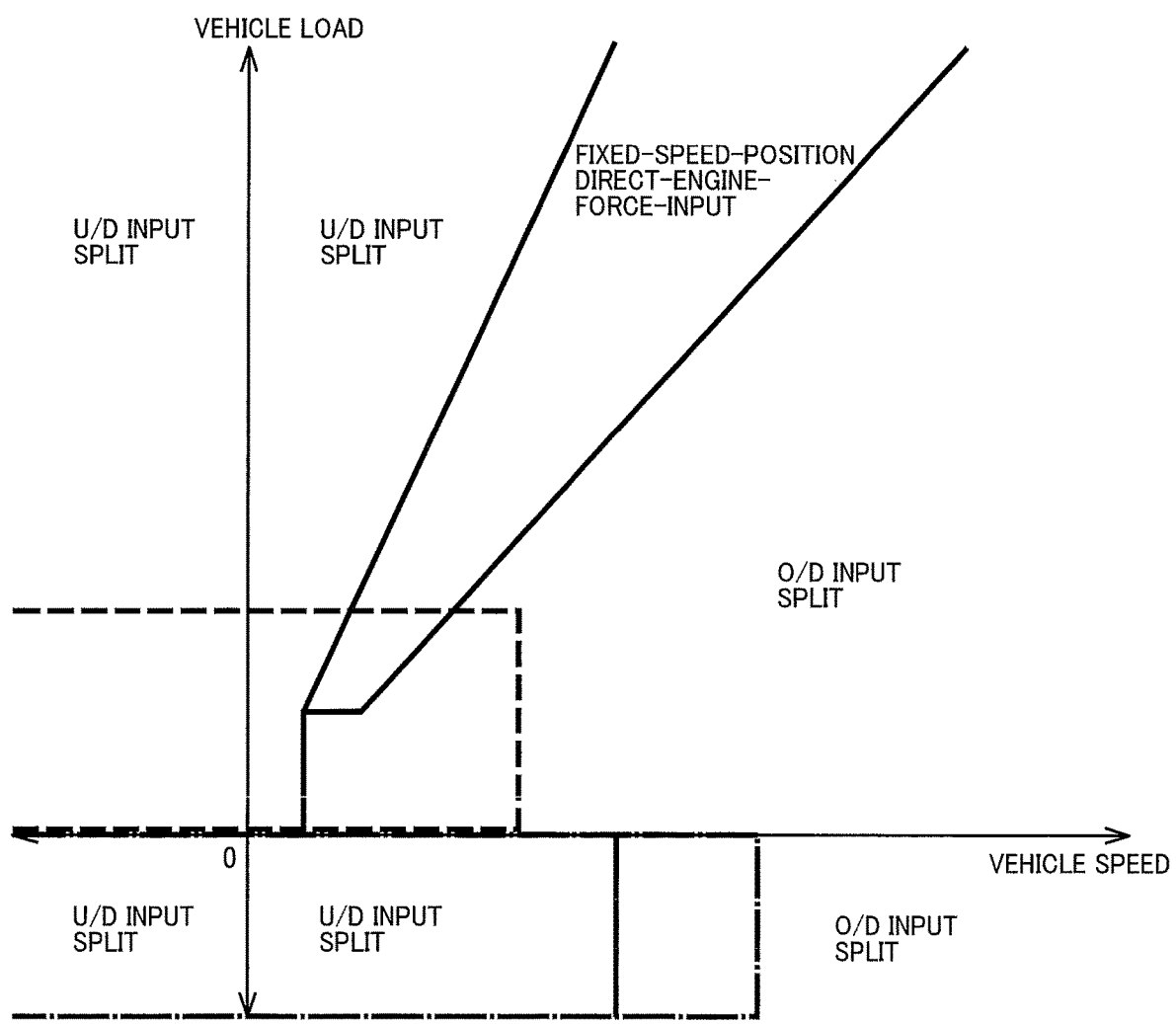
FIG. 19 is a view showing an example of a drive mode switching map formulated according to one embodiment of this invention, to selectively establish sub-modes of an engine drive mode and a motor drive mode such that an amount of electric power stored in a battery is held constant.
Figure 20:
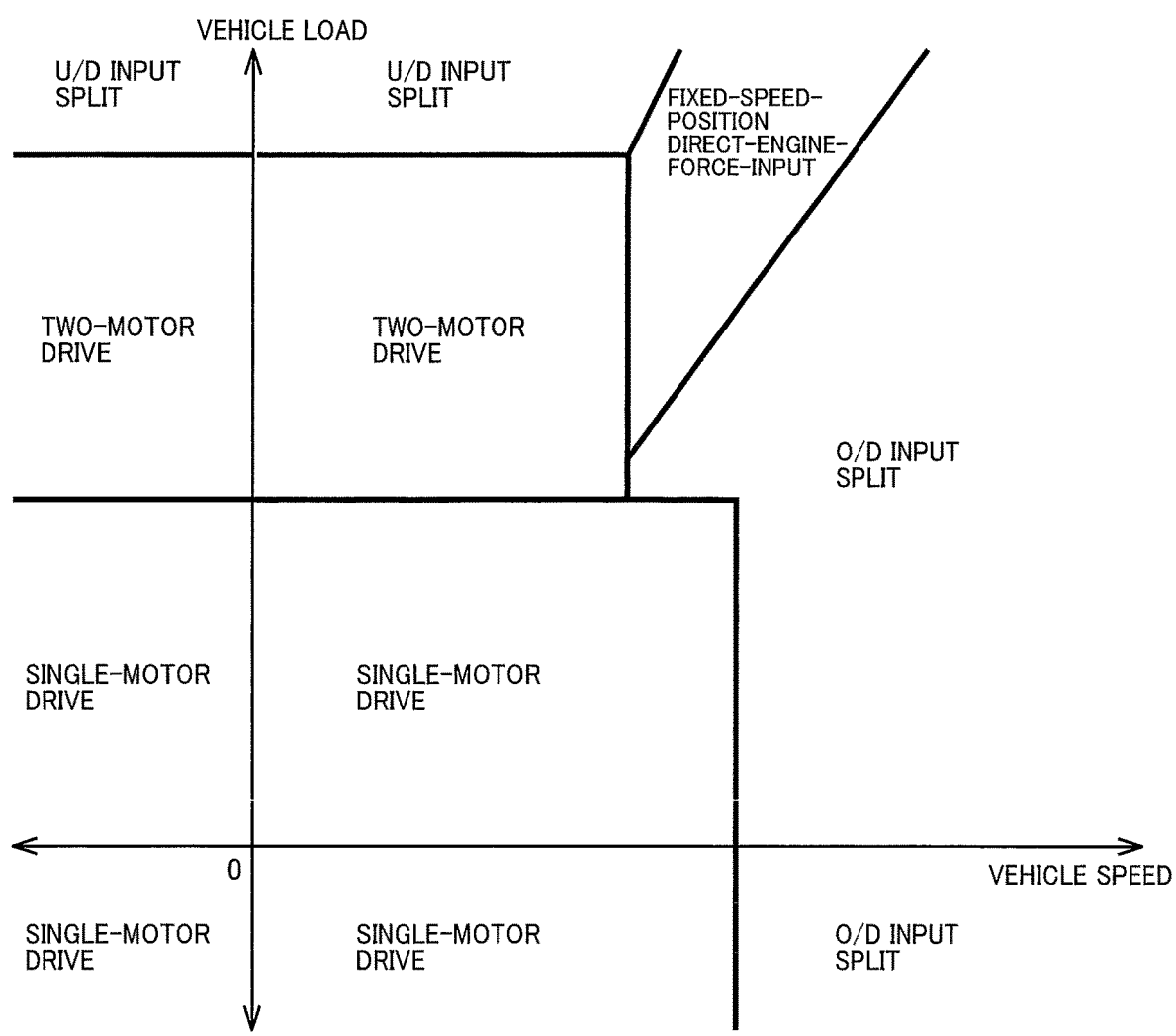
FIG. 20 is a view showing an example of a drive mode switching map formulated to selectively establish sub-modes of the engine drive mode and the motor drive mode such that the electric power stored in the battery is consumed.

The hybrid control portion 92 includes a drive mode setting portion 95 configured to select one of a motor drive mode (EV drive mode) and a hybrid drive mode (HV drive mode: also referred to as "engine drive mode") shown in FIG. 3, according to drive mode switching maps shown in FIGS. 19 and 20, and on the basis of: the engine speed Ne; the rotating speed No of the output shaft 24, which corresponds to the vehicle running speed V; the MG1 speed Ng; the MG2 speed Nm; the accelerator pedal operation amount θacc; the presently selected one of the operating positions POSsh of the shift lever such as the parking position P, the reverse drive position R, the neutral position N and the forward drive position D; and the temperature THbat, charging/discharging electric current Ibat and voltage Vbat of the battery unit 52. In the EV drive mode, at least one of the first motor/generator MG1 and the second motor/generator MG2 is operated as a vehicle drive power source while the engine 12 is held at rest. In the HV drive mode (engine drive mode), at least the engine 12 is operated as the vehicle drive power source, so that at least the drive force of the engine 12 is transmitted to the drive wheels 16 to drive the vehicle 10. It is noted that the HV drive mode is considered to include a state of the vehicle 10 in which the vehicle 10 is not directly driven by the engine 12 while the engine 12 is driving and the first motor/generator MG1 is operated with the drive force of the engine 12 to generate an electric power which is primarily used to charge the battery unit 52.

The power transmission switching portion 94 is configured to control the operating states of the clutch CL1, brake BR1 and clutch CLc, according to the drive mode selected by the hybrid control portion 92. The power transmission switching portion 94 applies the hydraulic control command signals Sp to the hydraulic control unit 60, for placing the clutch CL1, brake BR1 and clutch CLc in the engaged or released state, so that the vehicle drive force is transmitted to drive the vehicle 10 in the drive mode selected by the hybrid control portion 92.

The required vehicle drive force determining portion 96 is configured to determine whether a degree of operation of the accelerator pedal during reverse driving of the vehicle 10 is larger than a predetermined threshold value. The required vehicle drive force determining portion 96 may be configured to calculate the required vehicle drive force or torque on the basis of the degree of operation of the accelerator pedal such as the accelerator pedal operation amount θacc, and to determine whether the calculated required vehicle drive force or torque is larger than a predetermined threshold value. The threshold value is determined as a lower limit above which the output torque of the engine 12 is required to contribute to generation of the required reverse vehicle drive force during reverse running. When the required vehicle drive force determining portion 96 determines that the degree of operation of the accelerator pedal is larger than the threshold value, the drive mode setting portion 95 selects a first reverse drive mode as a result of an increase of the required reverse vehicle drive force. In the first reverse drive mode, a reverse drive force of the engine 12 is input to the vehicular power transmitting system 14, as indicated in the collinear chart of FIG. 14. In a second reverse drive mode, an output torque of the engine 12 placed in an operating state does not directly contribute to the generation of the required reverse vehicle drive force, as indicated in the collinear chart of FIG. 15.

The garage shift operation determining portion 98 is configured to determine whether a garage shift operation of the shift lever is performed to switch the drive mode of the vehicle 10 between the forward drive position D and the reverse drive position R, during running of the vehicle 10 with a drive force of the engine 12 at the running speed V lower than a predetermined value on a flat roadway surface, while the accelerator pedal is held in its non-operated position, for example.

As indicated in FIG. 3, the motor drive mode (EV drive mode) includes a plurality of sub-modes, and the engine drive mode (HV drive mode) includes a plurality of sub-modes. These sub-modes will be described by reference to FIGS. 4-16. FIG. 3 is the table indicating the operating states of the coupling elements (clutch CL1, brake BR1 and clutch CLc) in the different drive sub-modes of the vehicle 10. In the table, "o" indicates an engaged state of the coupling elements (clutch CL1, brake BR1 and clutch CLc), and a blank indicates a released state of the coupling elements, while "Δ" indicates an engaged state of at least one of the coupling element (clutch CL1 or CLc) (depending on running status) in an engine braking state of the vehicle 10 in which the engine 12 placed in its non-operated state is forcibly driven with a reverse drive force transmitted from the drive wheels 16. Further, "G" indicates that the motor/generator (MG1 or MG2) is operated primarily as an electric generator, while "M" indicates that the motor/generator is operated primarily as an electric motor to drive the vehicle 10, or as an electric generator to perform a regenerative operation. As indicated in FIG. 3, the vehicle 10 is driven in a selected one of the EV drive mode and the HV drive mode. The EV drive mode includes two kinds of sub-modes: single-motor-drive EV drive sub-modes in which only the second motor/generator MG2 is used as the vehicle drive power source; and a two-motor-drive EV drive sub-mode in which both of the first motor/generator MG1 and the second motor/generator MG2 are used as the vehicle drive power source. The HV drive mode includes three sub-modes: an overdrive (O/D) input split HV drive sub-mode; an under drive (U/D) input split HV drive sub-mode; and a fixed speed position sub-mode.

FIGS. 4-18 are the collinear charts indicating the relative rotating speeds of the rotary elements RE1-RE6 of the first differential mechanism 38 and the second differential mechanism 40. In these collinear charts, vertical lines Y1-Y4 which are spaced apart from each other in a horizontal direction and which are positioned in this order of description in a rightward direction indicate the rotating speeds of the rotary elements RE1-RE6. The vertical line Y1 represents the rotating speed of the fourth rotary element RE4 in the form of the second sun gear S2 connected to the first motor/generator MG1. The vertical line Y2 represents the rotating speed of the first rotary element RE1 in the form of the first carrier C1 connected to the engine 12 (represented as "ENG" in the collinear charts). The vertical line Y3 represents the rotating speed of the second rotary element RE2 in the form of the first ring gear R1 which is selectively connected to the casing 18 through the brake BR1, and the rotating speed of the fifth rotary element RE5 in the form of the second carrier C2 connected to the output shaft 24 (represented as "OUT" in the collinear charts). The vertical line Y4 represents the rotating speeds of the third rotary element RE3 in the form of the first sun gear S1 and the sixth rotary element RE6 in the form of the second ring gear R2 which are connected to each other. The output shaft 24 is connected to the second motor/generator MG2 through the speed reduction mechanism 44. In the collinear charts, an arrow-headed line extending from a white square mark "□" represents the MG1 torque Tg, and an arrow-headed line extending from a white circle mark "o" represents the engine torque Te, while an arrow-headed line extending from a black circle mark "●" represents the MG2 torque Tm. A non-hatched symbol of the clutch CL1 for selectively connecting the first carrier C1 and the first ring gear R1 indicates that the clutch CL1 is placed in its released state, while a hatched symbol of the clutch CL1 indicates that the clutch CL1 is placed in its engaged state. Further, a white diamond mark "◇" in connection with the brake BR1 for selectively connecting the first ring gear R1 to the casing 18 indicates that the brake BR1 is placed in its released state, while a black diamond mark "◆" in connection with the brake BR1 indicates that the brake BR1 is placed in its engaged state. A white diamond mark "◇" in connection with the clutch CLc for selectively connecting the first ring gear R1 and the second carrier C2 to each other indicates that the clutch CLc is placed in its released state, while a black diamond mark "◆" in connection with the clutch CLc indicates that the clutch CLc is placed in its engaged state. Further, broken lines represent the relative rotating speeds of the rotary elements of the first differential mechanism 38, while solid lines represent the relative rotating speeds of the rotary elements of the second differential mechanism 40. It is noted that the MG2 torque Tm represented by the arrow-headed line extending from the black circle mark "●" is the torque generated by the second motor/generator MG2 operated with an electric power generated by the first motor/generator MG1 operated with a portion of the drive force of the engine 12 distributed thereto, and/or an electric power supplied from the battery unit 52, but does not include a torque directly received from the engine 12. The black diamond mark "◆" overlapping the black circle mark "●" is not shown in the collinear charts. Distances between the adjacent ones of the vertical lines Y1, Y2, Y3 and Y4 are determined by gear ratios ρ1 and ρ2 of the differential mechanisms 38 and 40. Where a distance between the vertical lines representing the rotating speeds of the sun gear and the carrier is supposed to correspond to "1", a distance between the vertical lines representing the rotating speeds of the carrier and the ring gear corresponds to the gear ratio ρ of the relevant planetary gear device 38 or 40 (ρ=number of teeth of the sun gear/number of teeth of the ring gear).

Figure 4:
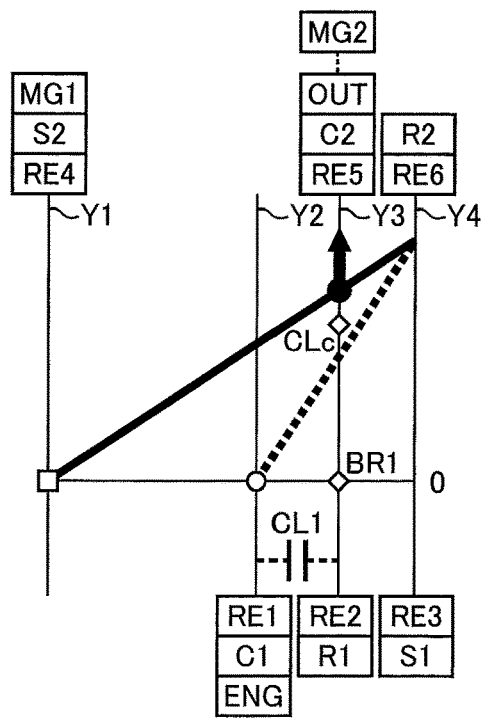
FIG. 4 is a collinear chart indicating relative rotating speeds of rotary elements of the vehicular power transmitting system when it is placed in its single-motor-drive EV forward drive sub-mode.
Figure 5:
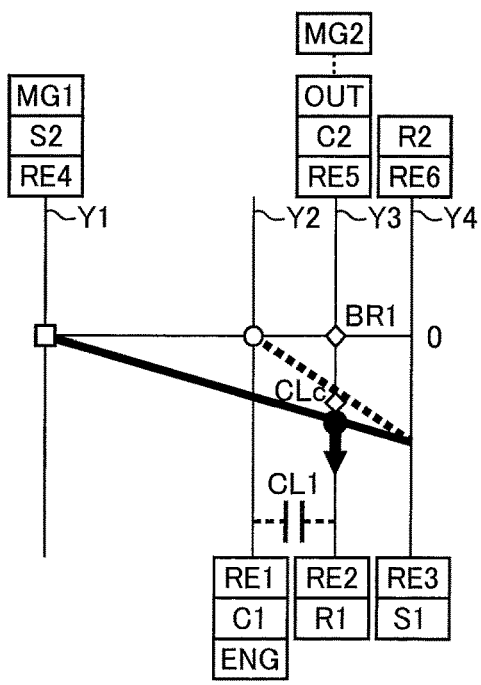
FIG. 5 is a collinear chart indicating the relative rotating speeds of the rotary elements when the vehicular power transmitting system is paced in its single-motor-drive EV reverse drive sub-mode.

FIGS. 4 and 5 are the collinear charts indicating relative rotating speeds of the rotary elements RE1-RE6 when the power transmitting system 14 is placed in its single-motor-drive EV drive sub-modes. In a normal sub-mode (represented as "NORMAL" in FIG. 3) of the single-motor-drive EV drive sub-mode, all of the clutch CL1, brake BR1 and clutch CLc are placed in the released states. In this normal sub-mode in which the clutch CL1 and the brake BR1 in the first differential mechanism 38 are placed in the released states, the first differential mechanism 38 is permitted to perform its differential function, and is placed in its neutral state. The hybrid control portion 92 commands the engine 12 to be held at rest, and commands the second motor/generator MG2 to generate the MG2 torque Tm. In the case of FIG. 4, the vehicle 10 is driven in the forward direction, with a positive torque of the second motor/generator MG2 operated in a positive direction (corresponding to a rotation direction of the second carrier C2 during forward driving of the vehicle 10). In the case of FIG. 5, the vehicle 10 is driven in the rearward direction, with a negative torque of the second motor/generator MG2 operated in a negative direction (corresponding to a rotation direction of the second carrier C2 during rearward driving of the vehicle 10). During running of the vehicle 10, the second carrier C2 connected to the output shaft 24 is rotated in synchronization with the rotary motion of the second motor/generator MG2 (the rotary motions of the drive wheels 16). In the normal sub-mode of the single-motor-drive EV drive sub-mode in which the clutch CLc is also placed in the released state, the engine 12 and the first motor/generator MG1 are not forcibly driven and are held stationary, so that the engine speed Ne and the MG1 speed Ng are kept at zero. Accordingly, an energy loss due to dragging of the engine 12 and the first motor/generator MG1 is reduced, and an amount of consumption of electric power can be reduced. The hybrid control portion 92 implements a feedback control to keep the MG1 speed Ng at zero. Alternatively, the hybrid control portion 92 implements a d-axis locking control so as to control an electric current applied to the first motor/generator MG1 so that the MG1 speed Ng is kept at zero. Where the MG1 speed Ng can be held at zero with a cogging torque of the first motor/generator MG1 even when the MG1 torque Tg is kept at zero, the first motor/generator MG1 need not be controlled to generate the MG1 torque Tg. It is noted that the control to keep the MG1 speed Ng at zero does not affect the vehicle drive torque, since the first power transmitting portion 20 is placed in its neutral state in which the first power transmitting portion 20 cannot withstand a reaction force against the MG1 torque Tg. Alternatively, the first motor/generator MG1 may be freely rotated in a non-load state, in the single-motor-drive EV drive sub-mode.

Figure 6:
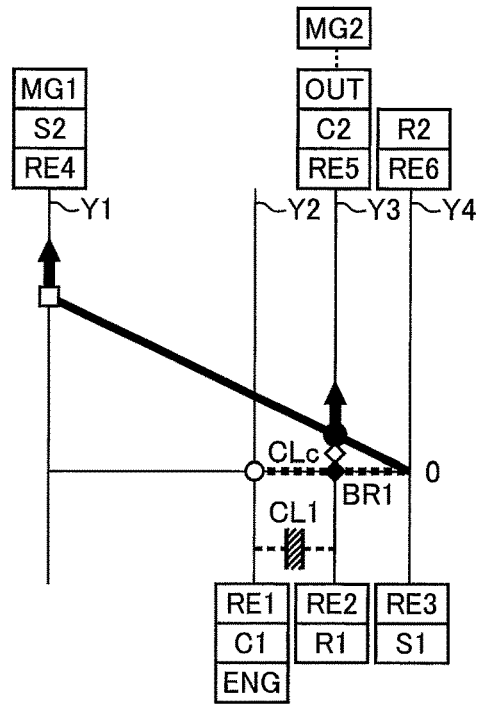
FIG. 6 is a collinear chart indicating the relative rotating speeds of the rotary elements when the vehicular power transmitting system is placed in its two-motor-drive forward EV drive sub-mode.
Figure 7:
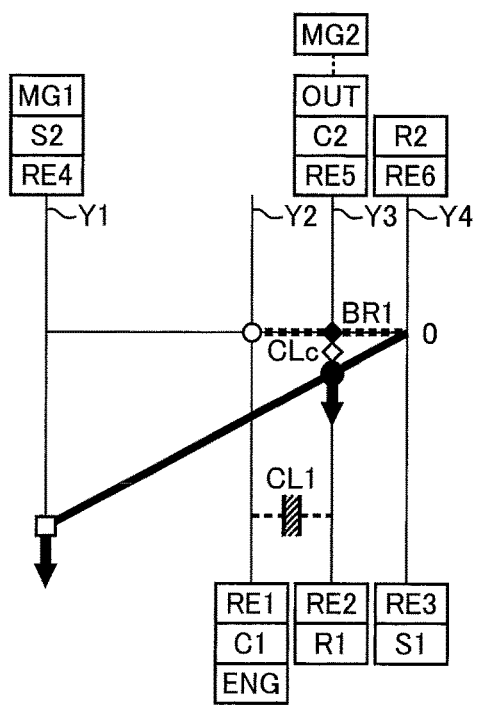
FIG. 7 is a collinear chart indicating the relative rotating speeds of the rotary elements when the vehicular power transmitting system is placed in its two-motor-drive reverse EV drive sub-mode.

FIGS. 6 and 7 are the collinear charts indicating the relative rotating speeds of the rotary elements RE1-RE6 when the power transmitting system 14 is placed in its two-motor-drive EV drive sub-mode. The two-motor-drive EV drive sub-mode (represented as "TWO-MOTOR DRIVE" in FIG. 3) is established in the engaged states of the clutch CL1 and the brake BR1, and in the released state of the clutch CLc. In the two-motor-drive EV drive sub-mode in which the clutch CL1 and the brake BR1 are placed in the engaged states, the differential operation of the first differential mechanism 38 is restricted, and the first ring gear R1 is held stationary. Accordingly, all of the rotary elements of the first differential mechanism 38 are held stationary, and the first differential mechanism 38 is placed in its internal locking state. Further, the second ring gear R2 connected to the first sun gear S1 is also held stationary, so that the second ring gear R2 can withstand a reaction force against the MG1 torque Tg, whereby a torque based on the MG1 torque Tg can be mechanically generated from the second carrier C2, and transmitted to the drive wheels 16. The hybrid control portion 92 commands the engine 12 to be held at rest, and commands the first motor/generator MG1 and the second motor/generator MG2 to generate the respective MG1 torque Tg and MG2 torque Tm. The collinear chart of FIG. 6 indicates the rotating speeds of the rotary elements RE1-RE6 when the vehicle 10 is driven in the forward direction, with the positive torques Tg and Tm generated by the respective first motor/generator MG1 and second motor/generator MG2 operated in the position direction. On the other hand, the collinear chart of FIG. 7 indicates the rotating speeds of the rotary elements RE1-RE6 when the vehicle 10 is driven in the rearward direction, with the negative torques Tg and Tm generated by the first motor/generator MG1 and second motor/generator MG2 operated in the negative direction.

As described above by reference to FIGS. 4-7, the vehicle 10 can be driven by only the second motor/generator MG2 in the single-motor-drive EV drive sub-mode, and by both of the first motor/generator MG1 and the second motor/generator MG2 in the two-motor-drive EV drive sub-mode. Accordingly, the vehicle 10 is driven by only the second motor/generator MG2 in the single-motor-drive EV drive sub-mode, while the vehicle 10 is in a low-load state, and by both of the first motor/generator MG1 and the second motor/generator MG2 in the two-motor-drive EV drive sub-mode, while the vehicle 10 is in a high-load state. It is noted that the second motor/generator MG2 is principally controlled to perform a regenerative operation during deceleration of the vehicle 10 even in the engine drive mode.

When the second motor/generator MG2 performs the regenerative operation during running of the vehicle 10 in the single-motor-drive EV drive sub-mode, the engine 12 held at rest is not forcibly driven and is held stationary with its speed Ne kept at zero, so that a large amount of electric power can be generated by the second motor/generator MG2. When the battery unit 52 is fully charged during running of the vehicle 10 in the single-motor-drive EV drive sub-mode, on the other hand, the battery unit 52 cannot be further charged with the electric power generated by the regenerative operation, so that a regenerative braking torque cannot be applied to the vehicle 10. When the battery unit 52 is fully charged in the single-motor-drive EV drive sub-mode so that the regenerative operation is not permitted, it is considered possible to apply an engine brake to the vehicle 10. When the battery unit 52 is not fully charged but is almost fully or considerably charged in the single-motor-drive EV drive sub-mode, it is considered possible to apply an assisting engine braking torque to the vehicle 10, in addition to the regenerative braking torque. When the electric power amount SOC stored in the battery unit 52 is so small that a sufficiently large amount of electric power cannot be supplied to the second motor/generator MG2 during running of the vehicle 10 in the single-motor-drive EV drive sub-mode, the second motor/generator MG2 cannot be operated as needed. In this case, it is considered possible to switch the drive mode from the EV drive mode to the engine drive mode (HV drive mode). In view of the situations described above, the EV drive mode includes standby sub-modes for quick application of the engine brake or for preparation for quick switching to the engine drive mode, and an assisting engine braking sub-mode in which the assisting engine braking torque is applied to the vehicle 10, in addition to the regenerative braking torque.

Figure 8:
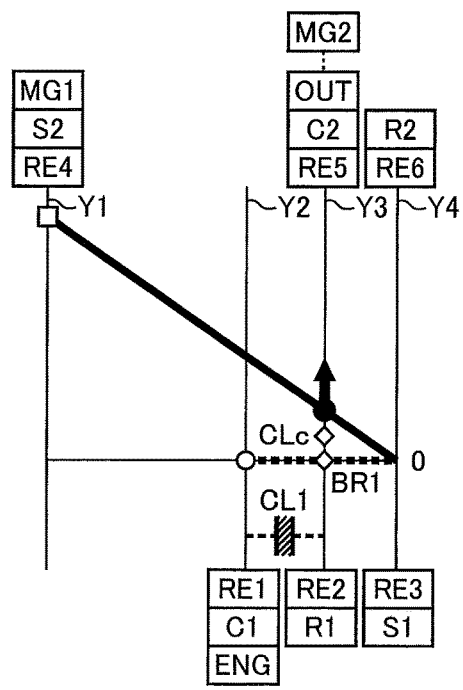
FIG. 8 is a collinear chart indicating the relative rotating speeds of the rotary elements when the vehicular power transmitting system is placed in its U/D input split standby sub-mode.
Figure 9:
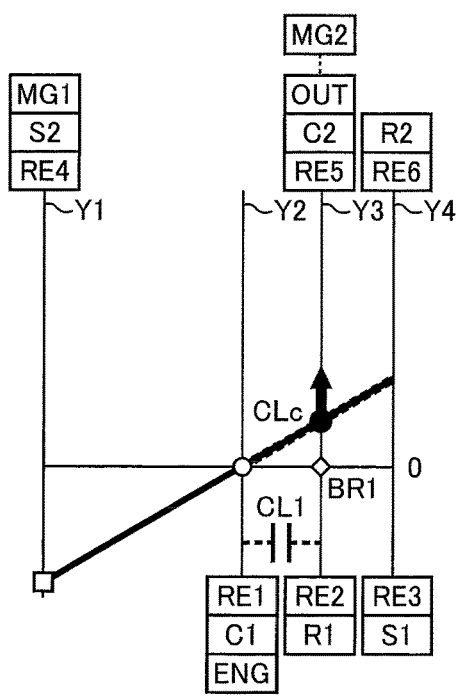
FIG. 9 is a collinear chart indicating the relative rotating speeds of the rotary elements when the vehicular power transmitting system is placed in its O/D input split standby sub-mode.

FIGS. 8 and 9 are the collinear charts indicating the relative rotating speeds of the rotary elements RE1-RE6 when the power transmitting system 14 is placed in its standby sub-modes of the EV drive mode. As indicated in the table of FIG. 3, the standby sub-modes (represented as "STANDBY SUB-MODES" in the table) are established in the engaged state of the clutch CL1 or the clutch CLc. While the engine 12 is forcibly driven in the engaged state of the clutch CL1 or CLc, the first motor/generator MG1 is freely rotatable in a non-load state in the standby sub-modes, so that the engine 12 held at rest is held stationary in the standby sub-modes. In the standby sub-modes, therefore, the second motor/generator MG2 can be operated as an electric motor to drive the vehicle 10 or to perform a regenerative operation, without application of an engine brake to the vehicle 10. When the engine speed Ne is raised by the first motor/generator MG1 in the standby sub-modes, the first motor/generator MG1 can withstand a reaction force against the engine torque Te (negative value), so that an engine brake according to the engine speed Ne can be applied to the vehicle 10. Further, when the engine 12 is ignited after the engine speed Ne has been raised by the first motor/generator MG1 in the standby sub-modes, the vehicle drive mode can be switched to the engine drive mode.

The operating states of the coupling elements (clutch CL1, brake BR1 and clutch CLc) in the standby sub-mode in which the clutch CL1 is placed in the engaged state as indicated in FIG. 8 are the same as in a U/D input split HV forward drive sub-mode described below. The standby sub-mode in which the clutch CL1 is placed in the engaged state and the engine 12 is held at rest will be referred to as a "U/D input split standby EV drive sub-mode".

The operating states of the coupling elements (clutch CL1, brake BR1 and clutch CLc) in the standby sub-mode in which the clutch CLc is placed in the engaged state as indicated in FIG. 9 are the same as in an O/D input split HV forward drive sub-mode described below. The standby sub-mode in which the clutch CLc is placed in the engaged state and the engine 12 is held at rest will be referred to as an "O/D input split standby EV drive sub-mode".

Figure 10:
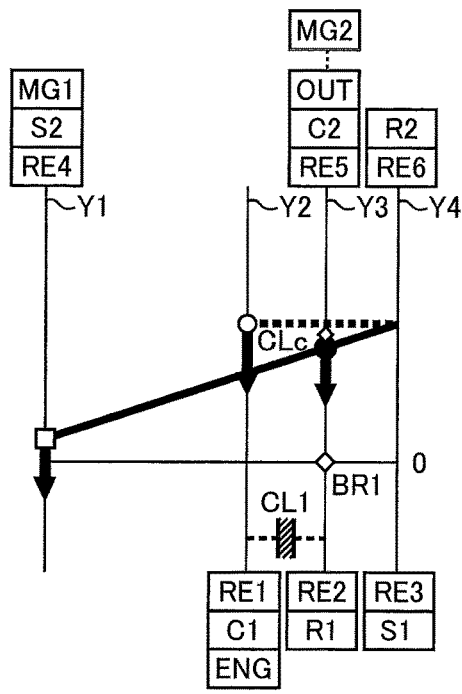
FIG. 10 is a collinear chart indicating the relative rotating speeds of the rotary elements when the vehicular power transmitting system is placed in its U/D input split engine-braking EV drive sub-mode.
Figure 11:
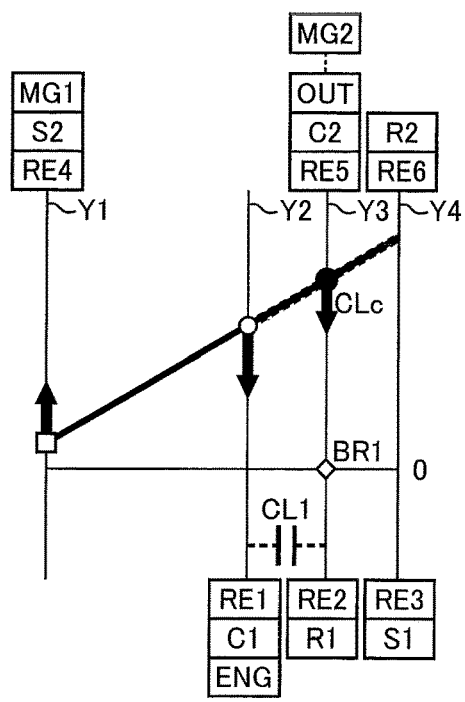
FIG. 11 is a collinear chart indicating the relative rotating speeds of the rotary elements when the vehicular power transmitting system is placed in its O/D input split engine-braking EV drive sub-mode.

FIGS. 10 and 11 are the collinear charts indicating the relative rotating speeds of the rotary elements RE1-RE6 when the power transmitting system 14 is placed in its engine-braking EV drive sub-modes. These engine-braking EV drive sub-modes (represented as "ASSISTING ENGINE BRAKING" in FIG. 3) are established in the engaged state of the clutch CL1 or CLc. Since the engine 12 is forcibly driven in the engaged state of the clutch CL1 or CLc, the first motor/generator MG1 can withstand a reaction force against the engine torque Te (negative value) while controlling the engine speed Ne, in the engine-braking EV drive sub-modes, so that an engine brake according to the engine speed Ne can be applied to the vehicle 10. In the engine-braking EV drive sub-modes, therefore, the engine brake can be applied to the vehicle 10, in addition to or in place of a regenerative brake by the second motor/generator MG2. Further, an engine brake can be applied to the vehicle 10 by placing the clutch CL1 or CLc in the engaged state, without a need of the first motor/generator MG1 to withstand the reaction force against the engine torque Te (negative value). The operating states of the coupling elements CL1, BR1 and CLc in the engine-braking EV drive sub-modes in which the clutch CL1 and the clutch CLc are engaged, are the same as in a fixed-speed-position direct-engine-force-input HV drive sub-mode described below.

The operating states of the coupling elements CL1, BR1 and CLc in the engine-braking EV drive sub-mode in which the clutch CL1 is placed in the engaged state as indicated in FIG. 10 are the same as in a U/D input split HV forward drive sub-mode described below. The engine-braking EV drive sub-mode in which the clutch CL1 is placed in the engaged state and the engine 12 is held at rest will be referred to as a "U/D input split engine-braking EV drive sub-mode".

The operating states of the coupling elements CL1, BR1 and CLc in the engine-braking EV drive sub-mode in which the clutch CLc is placed in the engaged state as indicated in FIG. 11 are the same as in an O/D input split HV forward drive sub-mode described below. The engine-braking EV drive sub-mode in which the clutch CLc is placed in the engaged state will be referred to as an "O/D input split engine-braking EV drive sub-mode".

Figure 12:
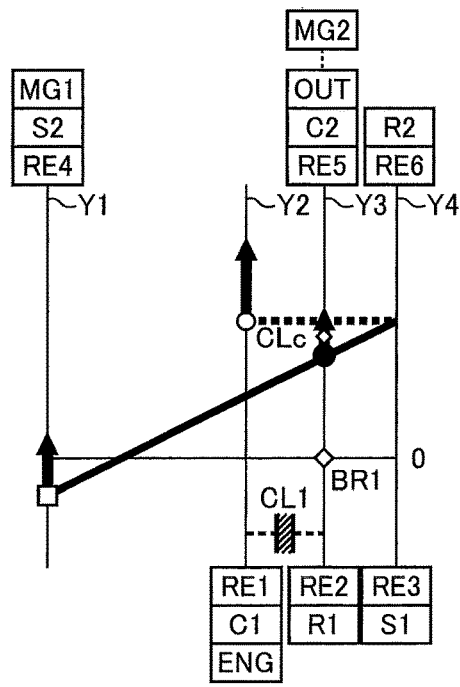
FIG. 12 is a collinear chart indicating the relative rotating speeds of the rotary elements when the vehicular power transmitting system is placed in its U/D input split HV forward drive sub-mode.

FIG. 12 is the collinear chart indicating the relative rotating speeds of the rotary elements RE1-RE6 when the power transmitting system 14 is placed in its U/D input split HV forward drive sub-mode. The U/D input split HV forward drive sub-mode (represented as "U/D INPUT SPLIT" and "FORWARD DRIVE" in FIG. 3) is established in the engaged state of the clutch CL1 and in the released states of the brake BR1 and the clutch CLc. In the U/D input split HV forward drive sub-mode in which the clutch CL1 is placed in the engaged state while the brake BR1 is placed in the released state, the first differential mechanism 38 is connected directly to the engine 12 such that the drive force of the engine 12 received by the first carrier C1 is transmitted directly to the second ring gear R2 connected to the first sun gear S1. In addition, the second differential mechanism 40 alone functions as an electrically controlled continuously variable transmission, in the U/D input split HV forward drive sub-mode in which the clutch CLc is placed in the released state. In the first power transmitting portion 20, therefore, the drive force of the engine 12 received by the second ring gear R2 can be distributed to the second sun gear S2 and the second carrier C2. Namely, the first motor/generator MG1 receives the reaction force against the engine torque Te transmitted to the second ring gear R2 in the first power transmitting portion 20, so that the engine torque Te is mechanically transmitted directly to the second carrier C2, and an electric power generated by the first motor/generator MG1 operated with a portion of the drive force of the engine 12 distributed thereto is supplied to the second motor/generator MG2 through a suitable electric path. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. The hybrid control portion 92 may command the second motor/generator MG2 to be operated with a sum of the electric power generated by the first motor/generator MG1 and an electric power supplied from the battery unit 52. In the example of FIG. 12, the vehicle 10 is driven in the forward direction with a positive torque generated by the second motor/generator MG2 operated in a positive direction. Namely, the U/D input split HV forward drive sub-mode is a first forward drive mode in which the engine speed Ne is lowered with an engaging action of the clutch CL1 (first coupling element which is one of the clutches CL1 and CLc), as indicated in FIG. 12, and the drive force of the engine 12 is transmitted to the output shaft 24.

Figure 13:
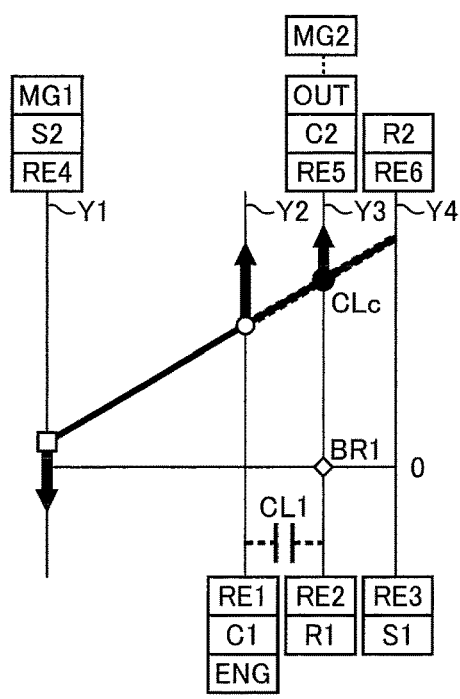
FIG. 13 is a collinear chart indicating the relative rotating speeds of the rotary elements when the vehicular power transmitting system is placed in its O/D input split HV forward drive sub-mode.

FIG. 13 is the collinear chart indicating the relative rotating speeds of the rotary elements RE1-RE6 when the power transmitting system 14 is placed in its O/D input split HV forward drive sub-mode. The O/D input split HV forward drive sub-mode (represented as "O/D INPUT SPLIT" and "FORWARD DRIVE" in FIG. 3) is established in the released states of the clutch CL1 and the brake BR1 and in the engaged state of the clutch CLc. In the O/D input split HV forward drive sub-mode in which the clutch CLc is placed in the engaged state, the first differential mechanism 38 and the second differential mechanism 40 cooperate to function as a single differential device. In addition, in the O/D input split HV forward drive sub-mode in which the clutch CL1 and the brake BR1 are placed in the released states, the first differential mechanism 38 and the second differential mechanism 40 cooperate to function as an electrically controlled continuously variable transmission a proportion of distribution of the engine drive force of which is different from that of the second differential mechanism 40 alone. In the first power transmitting portion 20, therefore, the drive force of the engine 12 received by the first carrier C1 can be distributed to the second sun gear S2 and the second carrier C2. Namely, the first motor/generator MG1 can receive the reaction force against the engine torque Te transmitted to the first carrier C1 in the first power transmitting portion 20, so that the engine torque Te is mechanically transmitted directly to the second carrier C2, and an electric power generated by the first motor/generator MG1 operated with a portion of the drive force of the engine 12 distributed thereto is supplied to the second motor/generator MG2 through a suitable electric path. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. In the example of FIG. 13, the vehicle 10 is driven in the forward direction with a positive torque generated by the second motor/generator MG2 operated in a positive direction. Namely, the O/D input split HV forward drive sub-mode is a second forward drive mode in which the engine speed Ne is raised with an engaging action of the clutch CLc (second coupling element which is the other of the clutches CL1 and CLc), as indicated in FIG. 13, and the drive force of the engine 12 is transmitted to the output shaft 24.

Figure 14:
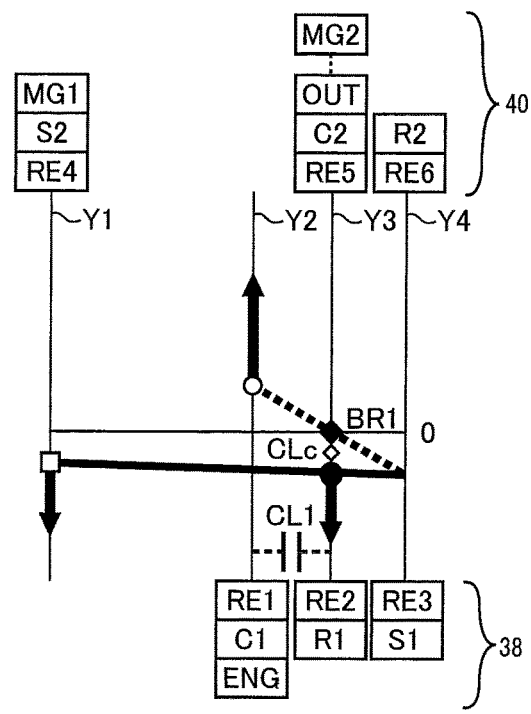
FIG. 14 is a collinear chart indicating the relative rotating speeds of the rotary elements when the vehicular power transmitting system is placed in its U/D input split HV reverse drive sub-mode, with a reverse input of an engine drive force.

FIG. 14 is the collinear chart indicating the relative rotating speeds of the rotary elements RE1-RE6 when the power transmitting system 14 is placed in its U/D input split HV reverse drive sub-mode, with a reverse input of the drive force of the engine 12, that is, while a negative torque of the engine 12 operating in a negative direction is applied to the power transmitting system 14 functioning as an electrically controlled continuously variable transmission. It is noted that the U/D input split HV reverse drive sub-mode with the reverse input of the engine drive force indicated in FIG. 14 is the first reverse drive mode. This U/D input split HV reverse drive sub-mode with the reverse input of the engine drive force (represented as "U/D INPUT SPLIT", "REVERSE DRIVE" and "REVERSE ENGINE DRIVE FORCE INPUT" in FIG. 3) is established in the engaged state of the brake BR1 and in the released states of the clutch CL1 and clutch CLc. In the U/D input split HV reverse drive sub-mode with the reverse engine drive force input in which the clutch CL1 is placed in the released state while the brake BR1 is placed in the engaged state, the first differential mechanism 38 receives the drive force of the engine 12 so as to generate a reverse vehicle drive force, so that the drive force of the engine 12 received by the first carrier C1 is transmitted to the second ring gear R2 connected to the first sun gear S1, such that the second ring gear R2 is rotated in a negative direction with a negative torque. In addition, the second differential mechanism 40 alone functions as an electrically controlled continuously variable transmission, in the U/D input split HV reverse drive sub-mode in which the clutch CLc is placed in the released state. In the first power transmitting portion 20, therefore, the reverse drive force of the engine 12 received by the second ring gear R2 can be distributed to the second sun gear S2 and the second carrier C2. The hybrid control portion 92 commands the engine 12 to be operated (started), and commands the first motor/generator MG1 to operate as an electric motor for generating the MG1 torque Tg corresponding to the reaction force against the engine torque Te, so that the second motor/generator MG2 is operated with the electric power stored in the battery unit 52, to generate the MG2 torque Tm. In the example of FIG. 14, the vehicle 10 is driven in the reverse direction with a negative torque generated by the second motor/generator MG2 operated in a negative direction. In the U/D input split HV reverse drive sub-mode in which the drive force of the engine 12 is transmitted to the second ring gear R2 such that the second ring gear R2 is rotated in the negative direction with the negative torque, the vehicle 10 can be driven in the reverse direction with the reverse driving torque transmitted from the second ring gear R2, in addition to the MG2 torque Tm. It is noted that the second motor/generator MG2 may be operated in the negative direction to generate a positive torque for an electric power for operating the first motor/generator MG1 to generate a vehicle driving torque. In this case, too, the vehicle 10 can be driven in the reverse direction, since the absolute value of the negative engine torque directly transmitted to the first differential mechanism 38 is larger than the absolute value of the MG2 torque Tm.

Figure 15:
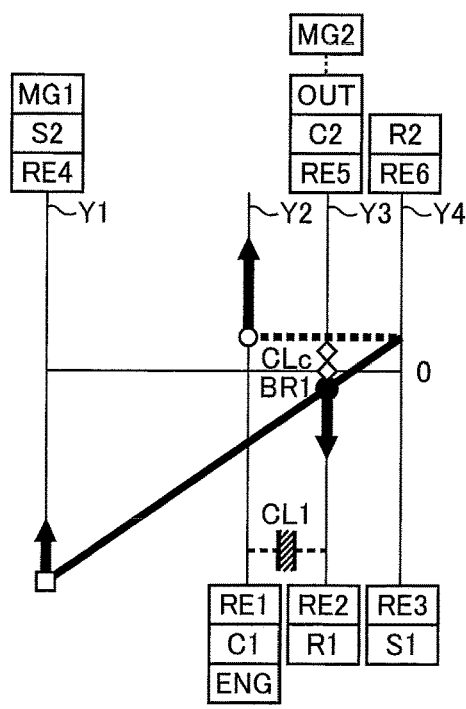
FIG. 15 is a collinear chart indicating the relative rotating speeds of the rotary elements when the vehicular power transmitting system is placed in its U/D input split HV reverse drive sub-mode, with a forward input of the engine drive force.

FIG. 15 is the collinear chart indicating the relative rotating speeds of the rotary elements RE1-RE6 when the power transmitting system 14 is placed in its U/D input split HV reverse drive sub-mode, with a forward input of the drive force of the engine 12. The U/D input split HV reverse drive sub-mode with the forward input of the engine drive force (represented as "U/D INPUT SPLIT", "REVERSE DRIVE" and "FORWARD ENGINE DRIVE FORCE INPUT" in FIG. 3) is established in the engaged state of the clutch CL1 and in the released states of the brake BR1 and the clutch CLc. In the U/D input split HV reverse drive sub-mode with the forward engine drive force input in which the clutch CL1 is placed in the engaged state while the brake BR1 is placed in the released state, the first differential mechanism 38 is connected directly to the engine 12 such that the drive force of the engine 12 received by the first carrier C1 is transmitted directly to the second ring gear R2 connected to the first sun gear S1. In addition, the second differential mechanism 40 alone functions as an electrically controlled continuously variable transmission, in the U/D input split HV reverse drive sub-mode with the forward engine drive force input in which the clutch CLc is placed in the released state. In the first power transmitting portion 20, therefore, the drive force of the engine 12 received by the second ring gear R2 can be distributed to the second sun gear S2 and the second carrier C2. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. In the example of FIG. 15, the vehicle 10 is driven in the reverse direction, in the second reverse drive mode, with a negative torque generated by the second motor/generator MG2 operated in a negative direction. It is noted that while the positive engine torque is directly transmitted to the first differential mechanism 38, the vehicle 10 can be driven in the reverse direction since the absolute value of a negative output torque of the second motor/generator MG2 operated by the electric power generated by the first motor/generator MG1 (or by the electric power generated by the first motor/generator MG1 and an electric power supplied from the battery unit 52) is larger than the absolute value of the directly transmitted positive engine torque. Namely, the U/D input split HV reverse drive sub-mode with the forward input of the drive force of the engine 12 is the second reverse drive mode wherein the negative torque of the second motor/generator MG2, which is larger in the absolute value than the positive torque of the engine 12 which is increased after starting of the engine 12 with an engaging action of the clutch CL1 and directly transmitted to the output shaft 24, is transmitted to the output shaft 24 as indicated in FIG. 15. It is noted that in the second reverse drive mode, the rotary motion of the engine 12 is transmitted to the second carrier C2, that is, to the output shaft 24, with reduction of the speed of the rotary motion, so that the torque of the engine 12 transmitted to the output shaft 24 is increased. The magnitude of the reverse vehicle drive torque in the second reverse drive mode is a difference between the negative output torque of the second motor/generator MG2 and the positive torque of the engine 12 directly transmitted to the output shaft 24.

Figure 16:
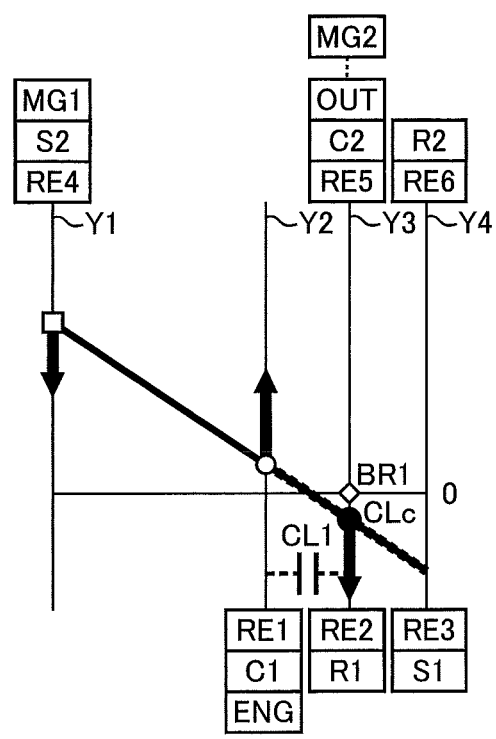
FIG. 16 is a collinear chart indicating the relative rotating speeds of the rotary elements when the vehicular power transmitting system is placed in its O/D input split HV reverse drive sub-mode, with a forward input of the engine drive force.

FIG. 16 is the collinear chart indicating the relative rotating speeds of the rotary elements RE1-RE6 when the power transmitting system 14 is placed in its O/D input split HV reverse drive sub-mode, with a forward input of the drive force of the engine 12. The O/D input split HV reverse drive sub-mode with the forward input of the engine drive force (represented as "O/D INPUT SPLIT", "REVERSE DRIVE" and "FORWARD ENGINE DRIVE FORCE INPUT" in FIG. 3) is established in the released states of the clutch CL1 and the brake BR1 and in the engaged state of the clutch CLc. In the O/D input split HV reverse drive sub-mode with the forward engine drive force input in which the clutch CLc is placed in the engaged state, the first differential mechanism 38 and the second differential mechanism 40 cooperate to function as a single differential device. In addition, in the O/D input split HV reverse drive sub-mode with the forward engine drive force input in which the clutch CL1 and the brake BR1 are placed in the released states, the first differential mechanism 38 and the second differential mechanism 40 cooperate to function as an electrically controlled continuously variable transmission a proportion of distribution of the engine drive force of which is different from that of the second differential mechanism 40 alone. In the first power transmitting portion 20, therefore, the drive force of the engine 12 received by the first carrier C1 can be distributed to the second sun gear S2 and the second carrier C2. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. In the example of FIG. 16, the vehicle 10 is driven in the reverse direction with a negative torque generated by the second motor/generator MG2 operated in a negative direction. It is noted that while the directly transmitted engine torque is positive, the vehicle 10 can be driven in the reverse direction in this O/D input split HV reverse drive sub-mode (with the forward engine drive force input), as in the U/D input split HV reverse drive sub-mode (with the forward engine drive force input). Namely, the O/D input split HV reverse drive sub-mode with the forward input of the drive force of the engine 12 is the first reverse drive mode wherein the negative torque of the second motor/generator MG2, which is larger in the absolute value than the positive torque of the engine 12 which is reduced after starting of the engine 12 with an engaging action of the clutch CLc and directly transmitted to the output shaft 24, is transmitted to the output shaft 24 as indicated in FIG. 16. It is noted that in the first reverse drive mode, the rotary motion of the engine 12 is transmitted to the second carrier C2, that is, to the output shaft 24, with an increase of the speed of the rotary motion, so that the torque of the engine 12 transmitted to the output shaft 24 is reduced. The magnitude of the reverse vehicle drive torque in the first reverse drive mode is a difference between the negative output torque of the second motor/generator MG2 and the positive torque of the engine 12 directly transmitted to the output shaft 24.

As described above by reference to FIGS. 12-16, when the first power transmitting portion 20 functions as the electrically controlled continuously variable transmission, the selected rotary elements of the first power transmitting portion 20 to which the drive force of the engine 12 is distributed in the U/D input split HV drive sub-modes are different from those in the O/D input split HV drive sub-modes, and the proportion of distribution of the engine drive force to the selected rotary elements in the U/D input split HV drive sub-modes is different from that in the O/D input split HV drive sub-modes. Namely, the ratios of the output torques and operating speeds of the first motor/generator MG1 and the second motor/generator MG2 with respect to the output torque and the operating speed of the engine 12 can be changed depending upon whether the O/D input split HV drive sub-modes or the U/D input split HV drive sub-modes are established. The operating state of the clutch CLc is changed to change the ratios of the output torques and operating speeds of the motor/generator MG1 and motor/generator MG2 to those of the engine 12, in the engine drive mode (HV drive mode).

In a so-called "mechanical point state" of the power transmitting system 14, the drive force of the engine 12 is entirely mechanically transmitted to the second carrier C2, without transmission through an electric power transmitting path involving electric power supply and reception to and from the first motor/generator MG1 and the second motor/generator MG2, while the MG1 speed Ng is held at zero. When the rotary motion of the engine 12 is output from the second carrier C2 after the operating speed of the engine 12 is reduced, in the mechanical point state, the power transmitting system 14 is placed in the U/D (under-drive) input split HV drive sub-modes. When the rotary motion of the engine 12 is output from the second carrier C2 after the operating speed of the engine 12 is raised, in the mechanical point state, the power transmitting system 14 is placed in the O/D (over-drive) input split HV drive sub-modes. It is noted that the torque directly transmitted from the engine 12 to the second carrier C2 in the U/D input split HV drive sub-modes is increased with respect to the engine torque Te, while the torque directly transmitted from the engine 12 to the second carrier C2 in the O/D input split HV drive sub-modes is reduced with respect to the engine torque Te.

Figure 17:
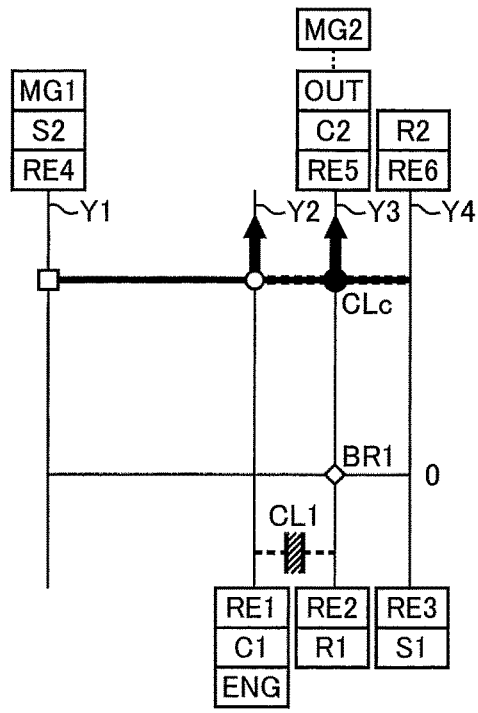
FIG. 17 is a collinear chart indicating the relative rotating speeds of the rotary elements when the vehicular power transmitting system is placed in its fixed-speed-position direct-engine-force-input HV drive sub-mode.

FIG. 17 is the collinear chart indicating the relative rotating speeds of the rotary elements RE1-RE6 when the power transmitting system 14 is placed in its fixed-speed-position direct-engine-force-input HV drive sub-mode while the rotary elements of each of the first and second differential mechanisms 38 and 40 are rotated as a unit. The fixed-speed-position direct-engine-force-input HV drive sub-mode (represented as "FIXED SPEED POSITION", "FORWARD DRIVE" and "DIRECT ENGINE FORCE INPUT" in FIG. 3) is established in the engaged states of the clutch CL1 and the clutch CLc, and in the released state of the brake BR1. In this fixed-speed-position direct-engine-force-input HV drive sub-mode in which the clutch CL1 is placed in the engaged state and the brake BR1 is placed in the released state, the first differential mechanism 38 is directly connected to the engine 12, and the rotary elements of each of the first differential mechanism 38 and the second differential mechanism 40 are rotated as a unit. Accordingly, the drive force of the engine 12 can be directly transmitted from the second carrier C2 through the first power transmitting portion 20. The hybrid control portion 92 commands the engine 12 to generate the vehicle driving engine torque Te. In the fixed-speed-position direct-engine-force-input HV drive sub-mode, the drive force of the first motor/generator MG1 operated with an electric power supplied from the battery unit 52 can also be transmitted directly to the second carrier C2, and the drive force of the second motor/generator MG2 operated with the electric power supplied from the battery unit 52 can also be transmitted to the drive wheels 16. Accordingly, the hybrid control portion 92 may command at least one of the first motor/generator MG1 and the second motor/generator MG2 to generate the vehicle driving torque, in addition to the engine torque Te. Namely, in the fixed-speed-position direct-engine-force-input HV drive sub-mode, the vehicle 10 may be driven with only the drive force of the engine 12, or together with an assisting torque generated by the first motor/generator MG1 and/or the second motor/generator MG2.

Figure 18:
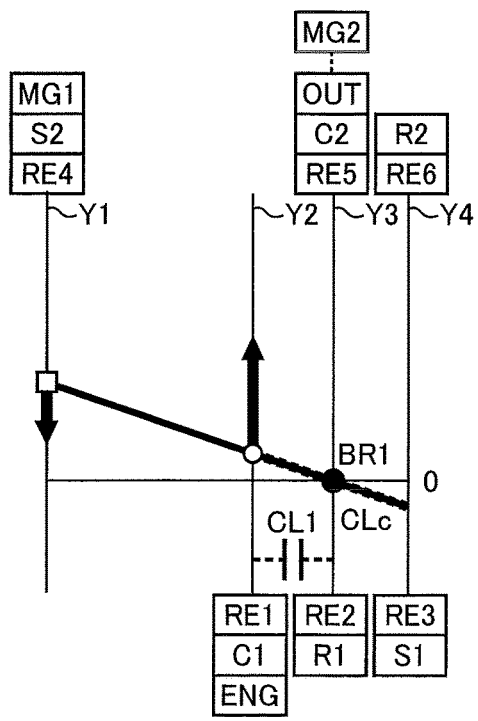
FIG. 18 is a collinear chart indicating the relative rotating speeds of the rotary elements when the vehicular power transmitting system is placed in its fixed-speed-position stationary-output-shaft HV drive sub-mode.

FIG. 18 is the collinear chart indicating the relative rotating speeds of the rotary elements RE1-RE6 when the power transmitting system 14 is placed in its fixed-speed-position stationary-output-shaft HV drive sub-mode, namely, while the second carrier C2 is held stationary. The fixed-speed-position stationary-output-shaft HV drive sub-mode (represented as "FIXED SPEED POSITION", "FORWARD DRIVE" and "STATIONARY OUTPUT SHAFT" in FIG. 3) is established in the engaged states of the brake BR1 and the clutch CLc and in the released state of the clutch CL1. In the fixed-speed-position stationary-output-shaft HV drive sub-mode in which the clutch CLc is placed in the engaged state, the first differential mechanism 38 and the second differential mechanism 40 cooperate to constitute one differential mechanism. In addition, the second carrier C2 is held stationary in the fixed-speed-position stationary-output-shaft HV drive sub-mode in which the brake BR1 is placed in the engaged state and the clutch CL1 is placed in the released state. In the first power transmitting portion 20, therefore, the first motor/generator MG1 can withstand the reaction force against the drive force of the engine 12 transmitted to the first carrier C1, so that the battery unit 52 can be charged with an electric power generated by the first motor/generator MG1 operated with the drive force of the engine 12. The hybrid control portion 92 commands the engine 12 to be operated (started), and commands the first motor/generator MG1 to be operated as an electric generator to generate the electric power for charging the battery unit 52 through the electric power control unit 50 while the reaction force is generated. The present fixed-speed-position stationary-output-shaft HV drive sub-mode in which the second carrier C2 is held stationary is an HV drive sub-mode exclusively used to charge the battery unit 52 while the vehicle 10 is held stationary. As described above by reference to FIGS. 17 and 18, the clutch CLc is placed in the engaged state in the fixed-speed-position direct-engine-force-input HV drive sub-mode and the fixed-speed-position stationary-output-shaft HV drive sub-mode.

When a speed reduction ratio I (=Ne/No) of the first power transmitting portion 20 is comparatively high, an absolute value of an output ratio Pg/Pe of an MG1 power Pg of the first motor/generator MG1 to an engine power Pe of the engine 12, and an absolute value of an output ratio Pm/Pe of an MG2 power Pm of the second motor/generator MG2 to the engine power Pe are lower in the U/D input split HV drive sub-modes than in the O/D input split HV drive sub-modes. When the speed reduction ratio I is comparatively high, therefore, an increase of the MG1 power Pg and an increase of the MG2 power Pm can be restricted in the U/D input split HV drive sub-modes. When the speed reduction ratio I is comparatively low, such as lower than 1, on the other hand, the output ratio Pm/Pe is a negative value (namely, the output ratio Pg/Pe is a positive value), so that the absolute values of the output ratios Pm/Pe and Pg/Pe are higher in the U/D input split HV drive sub-modes than in the O/D input split HV drive sub-modes. When the output ratio Pm/Pe is negative (namely, when the output ratio Pg/Pe is positive), the power transmitting system 14 is placed in a drive force circulating state in which the second motor/generator MG2 is operated as an electric generator to generate an electric power to be supplied to the first motor/generator MG1. However, it is desirable to prevent from this drive force circulating state as much as possible. Accordingly, an amount of power required in the drive force circulating state can be reduced by establishing the O/D input split HV drive sub-modes when the speed reduction ratio I is comparatively low. By suitably switching the HV drive mode between the U/D input split HV drive sub-modes and the O/D input split HV drive sub-modes according to the speed reduction ratio I, the power of the engine 12 can be transmitted with reduced outputs of the motor/generator MG1 and the motor/generator MG2.

That is, it is desirable to selectively establish the U/D input split HV drive sub-modes and the O/D input split HV drive sub-modes such that the U/D input split HV drive sub-modes are established in a high-load state of the engine 12 in which the speed reduction ratio I is comparatively high, while the O/D input split HV drive sub-modes are established in a low-load state of the engine 12 or in a high-speed running state of the vehicle 10 in which the speed reduction ratio I is comparatively low, so that the increases of the torques and speeds of the motor/generator MG1 and the motor/generator MG2 are prevented or reduced, and so that the amount of power required in the drive force circulating state can be reduced in the high-speed running state of the vehicle 10. By selectively establishing the U/D and O/D input split HV drive sub-modes as described above, an energy conversion loss in the electric path can be reduced, and the fuel economy of the vehicle 10 can be improved, or the required sizes or output capacities of the motor/generator MG1 and the motor/generator MG2 can be reduced.

FIGS. 19 and 20 are the views showing examples of drive mode switching maps used to selectively establish the sub-modes of the engine drive mode (HV drive mode) and the motor drive mode (EV drive mode). Each of these drive mode switching maps is defined in a two-dimensional coordinate system wherein the vehicle running speed V is taken along a horizontal axis while a running load of the vehicle 10 (hereinafter referred to as "vehicle load" as represented by the required vehicle drive torque) is taken along a vertical axis. Namely, the vehicle speed V and the vehicle load are selected control parameters used to selectively establish the sub-modes of the HV drive mode and the EV drive mode. The drive mode switching maps have switching boundary lines defining the different sub-modes of the HV drive mode and the EV drive mode. The drive mode switching maps are obtained by experimentation or theoretical analysis, and are stored in a memory of the electronic control device 90.

The drive mode switching map of FIG. 19 is formulated to selectively establish the sub-modes while the power transmitting system 14 is placed in a CS state (charge sustainable state) in which the electric power amount SOC stored in the battery unit 52 is held constant. The drive mode switching map of FIG. 19 is used where the vehicle 10 is a hybrid vehicle wherein the maximum electric power amount SOC that can be stored in the battery unit 52 is comparatively small, or while the vehicle 10 is running in a mode to hold the electric power amount SOC constant and where the vehicle 10 is a plug-in hybrid vehicle or a "drive-range-extended" vehicle wherein the maximum electric power amount SOC is comparatively large.

On the other hand, the drive mode switching map of FIG. 20 is used while the power transmitting system 14 is placed in a CD state (charge depleting state) in which the electric power amount SOC is consumed. The drive mode switching map of FIG. 20 is used while the vehicle 10 is running in a mode to consume the electric power amount SOC, and where the vehicle 10 is the plug-in hybrid vehicle or "drive-range-extended" vehicle wherein the maximum electric power amount SOC is comparatively large. Where the vehicle 10 is a hybrid vehicle wherein the maximum electric power amount SOC is comparatively small, it is desirable not to use the drive mode switching map of FIG. 20.

In the drive mode switching map of FIG. 19, the switching boundary lines are determined to selectively establish the sub-modes of the HV drive mode according to the running state of the vehicle 10 as represented by its running speed V and load, such that the U/D input split HV drive sub-modes are established in a high-load state of the vehicle 10, or the O/D input split HV drive sub-modes are easily established in a low-load state or a high-speed state of the vehicle 10. The boundary lines of FIG. 19 define areas of the vehicle running state in which the U/D and O/D input split HV drive sub-modes and the fixed-speed-position direct-engine-force-input HV drive sub-mode are selected, such that the area in which the fixed-speed-position direct-engine-force-input sub-mode is selected is located between the areas in which the U/D and O/D input split sub-modes are selected. When the electric power stored in the battery unit 52 can be consumed (or after a warm-up operation of the engine 12 is finished, or warm-up operations of various devices of the vehicle 10 by the engine 12 are finished), the second motor/generator MG2 is operated to generate a vehicle driving torque in the motor drive mode (EV drive mode) when the vehicle 10 is in a running state in which the engine 12 has a low degree of operating efficiency. Accordingly, single-motor-drive EV drive sub-modes are established in a low-speed low-load state of the vehicle 10, as indicated by broken lines in FIG. 19. Further, when the load of the vehicle 10 is negative, the U/D input split HV drive sub-modes or the O/D input split HV drive sub-modes are established to decelerate the vehicle 10 with an engine brake applied by the engine 12 having a negative torque. When the battery unit 52 can store an electric power, the second motor/generator MG2 is operated as an electric generator in the motor drive mode. The single-motor-drive EV drive sub-modes are established in a negative-load state of the vehicle 10, as indicated by one-dot chain lines in FIG. 19. According to the drive mode switching map of FIG. 19 used in the CS state of the vehicle 10, the U/D input split HV drive sub-modes are established upon starting of the vehicle 10 in both of the forward and reverse directions. Thus, the engine power Pe can be more effectively utilized, so that driving performance of the vehicle 10 in starting can be improved. The speed reduction ratio I of the first power transmitting portion 20 becomes close to "1" as the vehicle running speed V is raised during forward running of the vehicle 10. In this state, the power transmitting system 14 is switched to the fixed-speed-position direct-engine-force-input sub-mode. In the low-speed state of the vehicle 10 in which the engine speed Ne is extremely low, the power transmitting system 14 is switched from the U/D input split HV drive sub-modes directly to the O/D input split HV drive sub-modes. In the fixed-speed-position direct-engine-force-input sub-mode of the HV drive mode in which the drive force of the engine 12 is not transmitted through the first motor/generator MG1 and the second motor/generator MG2, there is not a heat loss generated due to conversion between mechanical and electric energies, resulting in effective improvement of the fuel economy and prevention of heat generation. In this respect, it is considered desirable to positively establish the fixed-speed-position direct-engine-force-input sub-mode during towing or in any other high-load state or in a high-speed state of the vehicle 10. When the motor drive mode is established by operation of a motor-drive-mode selector switch by the vehicle operator, the single-motor-drive sub-modes of the motor drive mode are established in the running state of the vehicle 10 indicated by the broken lines of FIG. 19.

In the drive mode switching map of FIG. 20, the switching boundary lines are determined to selectively establish the EV drive sub-modes according to the running state of the vehicle 10 as represented by its running speed V and load such that the single-motor-drive EV drive sub-modes are established in a low-load state of the vehicle 10, and the two-motor-drive EV drive sub-mode is established in a high-load state of the vehicle 10. In the two-motor-drive EV drive sub-mode, the power output ratio of the first motor/generator MG1 and the second motor/generator MG2 is determined on the basis of operating efficiencies of the motor/generator MG1 and motor/generator MG2, so as to improve the power consumption economy and lower the temperature of the motor/generator MG1 and motor/generator MG2, and to lower the temperature of the electric power control unit 50. The switching boundary lines may be determined to establish the sub-modes of the HV drive mode in the high-load and high-speed states of the vehicle 10, as indicated in FIG. 20, to use the engine 12 as the vehicle drive power source, according to maximum output of the battery unit 52 and maximum outputs of the motor/generators MG1 and MG2 or in a case where a rise of the rotating speed of any of the rotary elements of the power transmitting system 14 due to an amount of rise of the vehicle running speed V in the EV drive mode is reduced with an operation of the engine 12. The boundary lines of FIG. 20 define areas of the vehicle running state in which the U/D and O/D input split HV drive sub-modes and the fixed-speed-position direct-engine-force-input HV drive sub-mode are selected, such that the area in which the fixed-speed-position direct-engine-force-input sub-mode is selected is located between the areas in which the U/D and O/D input split sub-modes are selected. Further, the switching boundary lines are determined to establish the single-motor-drive EV drive sub-modes in a negative-load state of the vehicle 10, so that the second motor/generator MG2 performs a regenerative operation. According to the thus formulated drive mode switching map of FIG. 20 used in the CD state, a rise of the vehicle running speed V causes rises of the operating speeds of the motor/generator MG1 and the motor/generator MG2 and the rotating speeds of the rotary elements of the differential mechanisms 38 and 40. To prevent this problem, the drive mode is switched from the EV drive sub-modes to the HV drive sub-modes according to the drive mode switching map of FIG. 19 used in the CS state. It is noted that since the first motor/generator MG1 and the engine 12 are disconnected from each other (power transmission between the first motor/generator MG1 and the engine 12 is interrupted) in the single-motor-drive EV drive sub-modes, the drive mode switching map of FIG. 20 may be modified to establish the single-motor-drive sub-modes of the EV drive mode in a wider range of the vehicle speed V an upper limit of which is higher than that of a range in which the two-motordrive sub-mode is established. Although the switching map of FIG. 20 is formulated such that the single-motor-drive sub-modes of the EV drive modes are established to perform a regenerative operation in a negative-load state of the vehicle 10, the single-motor-drive sub-modes may be replaced by the two-motor-drive sub-modes. Further, the switching map of FIG. 20 may be formulated to prevent starting of the engine 12 and consumption of the fuel, by limiting the vehicle drive torque or the vehicle speed V within a predetermined upper limit.

Referring back to FIG. 1, the drive mode setting portion 95 of the hybrid control portion 92 selects one of the sub-modes of the EV and HV drive modes, on the basis of the actual vehicle speed V and load (e.g., required vehicle drive torque), and according to the drive mode switching maps of FIGS. 19 and 20.

When the drive mode setting portion 95 selects one of the single-motor-drive EV drive sub-modes, the vehicle 10 can be driven with only the second motor/generator MG2 used as the vehicle drive power source. When the hybrid control portion 92 selects the two-motor-drive EV drive sub-mode, the vehicle 10 can be driven with both of the first motor/generator MG1 and the second motor/generator MG2 used as the vehicle drive power source.

When the drive mode setting portion 95 selects the U/D input split HV drive sub-mode shown in FIG. 12, or the O/D input split HV drive sub-mode shown in FIG. 13, the vehicle 10 can be driven with a torque transmitted to the drive wheels 16 from the second motor/generator MG2 operated with an electric power generated by the first motor/generator MG1, while a torque is transmitted from the engine 12 directly to the second carrier C2, with the first motor/generator MG1 operating as an electric generator so as to withstand a reaction torque against the drive force of the engine 12. In the U/D input split HV drive sub-modes and the O/D input split HV drive sub-modes, the hybrid control portion 92 commands the engine 12 to be operated at its operating point (represented by the engine speed Ne and the engine torque Te), which is determined according to a known highest fuel economy line of the engine 12. In this respect, it is noted that the second motor/generator MG2 may be operated with an electric power supplied from the battery unit 52, as well as the electric power generated by the first motor/generator MG1, in the U/D input split HV drive sub-modes and the O/D input split HV drive sub-modes.

When the drive mode setting portion 95 selects the fixed-speed-position direct-engine-force-input HV drive sub-mode, the vehicle 10 can be driven with the drive force of the engine 12 directly output to the second carrier C2. In the fixed-speed-position direct-engine-force-input HV drive sub-mode, the hybrid control portion 92 may command the first motor/generator MG1 to be operated with the drive force of the engine 12, as well as the electric power supplied from the battery unit 52, so that a drive force of the first motor/generator MG1 is directly output from the second carrier C2, or command the second motor/generator MG2 to be operated with the electric power supplied from the battery unit 52, so that the drive force of the second motor/generator MG2 is transmitted to the drive wheels 16.

When the vehicle 10 is stopping and the electric power amount SOC stored in the battery unit 52 is smaller than a predetermined lower limit below which the battery unit 52 is required to be charged, the drive mode setting portion 95 selects the fixed-speed-position stationary-output-shaft HV drive sub-mode. In the fixed-speed-position stationary-output-shaft HV drive sub-mode, the hybrid control portion 92 commands the first motor/generator MG1 to be operated as an electric generator to generate an electric power for charging the battery unit 52 through the electric power control unit 50, while the first motor/generator MG1 withstands the reaction force against the drive force of the engine 12.

In both of the U/D input split HV drive sub-mode and the O/D input split HV drive sub-mode, the first power transmitting portion 20 functions as an electrically controlled continuously variable transmission. A state of the power transmitting system 14 in which the speed reduction ratio I of the first power transmitting portion 20 is equal to "1" is equivalent to a state in the fixed-speed-position direct-engine-force-input HV drive sub-mode (shown in FIG. 15) in which both of the clutch CL1 and the clutch CLc are placed in the engaged states. Accordingly, the power transmission switching portion 94 switches the operating states of the clutch CL1 and the clutch CLc when the speed reduction ratio I is equal to "1", so that the vehicular power transmitting system 14 is switched between the U/D input split HV drive sub-mode (in which the clutch CL1 is placed in the engaged state) and the O/D input split HV drive sub-mode (in which the clutch CLc is placed in the engaged state) through the fixed-speed-position direct-engine-force-input HV drive sub-mode. Alternatively, the power transmission switching portion 94 may switch the vehicular power transmitting system 14 between the U/D input split HV drive sub-mode (in which the clutch CL1 is placed in the engaged state) and the O/D input split HV drive sub-mode (in which the clutch CLc is placed in the engaged state), by controlling the clutches CL1 and CLc so as to implement their concurrent or synchronous engaging and releasing actions.

In the single-motor-drive EV drive sub-modes, the clutch CL1 or the clutch CLc is placed in the engaged state, so that the engine 12 is forcibly driven with the reverse drive force transmitted from the drive wheels 16. When the hybrid control portion 92 commands the engine 12 to be started in the single-motor-drive sub-modes of the EV drive mode, the power transmission switching portion 94 commands the clutch CL1 or the clutch CLc to be brought into its engaged state, for raising the engine speed Ne for ignition of the engine 12. In this case, the hybrid control portion 92 may command the first motor/generator MG1 to be operated to raise the engine speed Ne.

Alternatively, the hybrid control portion 92 commands the engine 12 to be started in the single-motor-drive EV drive sub-modes, by controlling the first motor/generator MG1 to implement a synchronous control of the rotating speeds of the rotary elements of the first and second differential mechanisms 38 and 40, such that the differential mechanisms 38 and 40 are placed in a state identical with a state in which the clutch CL1 or the clutch CLc is placed in the engaged state while the engine speed Ne is zero [rpm]. The power transmission switching portion 94 commands the clutch CL1 to be brought into the engaged state when the state of the differential mechanisms 38, 40 becomes identical with the state in which the clutch CL1 is placed in the engaged state, or commands the clutch CLc to be brought into the engaged state when the state of the differential mechanisms 38, 40 becomes identical with the state in which the clutch CLc is placed in the engaged state, so that the engine speed Ne is raised by the first motor/generator MG1, for ignition of the engine 12. Namely, when the engine 12 is started in the single-motor-drive EV drive sub-modes, the hybrid control portion 92 implements the synchronous control of the rotating speeds of the rotary elements of the differential mechanisms 38, 40 with the first motor/generator MG1, such that the rotating speeds are the same as in the standby sub-modes, although the standby sub-modes are not yet established, that is, before the clutch CL1 or CLc to establish the corresponding standby sub-mode is brought into the engaged state. After the synchronous control is implemented, the relevant clutch CL1 or CLc is brought into the engaged state to temporarily establish the standby sub-mode. In the thus established standby sub-mode, the first motor/generator MG1 is operated to raise the engine speed Ne for thereby igniting the engine 12. As described above, the engine 12 may be started in the single-motor-drive EV drive sub-modes, by switching the drive mode from the single-motor-drive EV drive sub-modes to the engine drive mode (HV drive mode) through the standby sub-modes of the EV drive mode. In this case, the vehicular power transmitting system 14 is switched to the U/D input split HV drive sub-mode through the corresponding U/D input split EV drive sub-mode, or to the O/D input split HV drive sub-mode through the corresponding O/D input split EV drive sub-mode.

Upon starting of the engine 12, a negative torque of the engine 12 is transmitted to the second carrier C2 connected to the drive wheels 16, as a reaction force to raise the speed Ne of the engine 12 held at rest, so that the vehicle drive torque is reduced. When the engine 12 is started in the single-motor-drive EV drive sub-modes, the hybrid control portion 92 commands the second motor/generator MG2 to generate an assisting drive torque (reaction force canceling torque) for compensation for an amount of reduction of the vehicle drive torque, to reduce a risk of generation of an engine starting shock.

In the two-motor-drive EV drive sub-mode in which the clutch CL1 and the brake BR1 are placed in the engaged states, the engine 12 is forcibly driven if the brake BR1 is brought into the released state. To start the engine 12 in the two-motor-drive EV drive sub-mode, therefore, the power transmission switching portion 94 commands the brake BR1 to be brought into the released state and then commands the clutch CLc to be brought into the engaged state, to raise the engine speed Ne for ignition of the engine 12. In this case, the hybrid control portion 92 may command the first motor/generator MG1 to be operated to raise the engine speed Ne. Alternatively, the power transmission switching portion 94 may command the brake BR1 to be brought into the released state, to raise the engine speed Ne for ignition of the engine 12, for starting the engine 12 in the two-motor-drive EV drive sub-mode. Further alternatively, the engine 12 can be started in the single-motor-drive EV drive sub-mode, by bringing the clutch CL1 and the brake BR1 into the released states, since the differential mechanisms 38 and 40 in the two-motor-drive EV drive sub-mode are placed in the same state as in the single-motor-drive EV drive sub-mode, by placing the clutch CL1 and the brake BR1 in the released states. The hybrid control portion 92 commands the second motor/generator MG2 to generate the reaction force canceling force as the assisting drive torque, for starting the engine 12 in the two-motor-drive EV drive sub-mode.

The drive mode setting portion 95 selects the second reverse drive mode indicated in FIG. 15, when the shift lever is operated to the reverse drive position R during forward running of the vehicle 10 with the drive force of the engine 12. When the accelerator pedal operation amount θacc or the required vehicle drive force corresponding to the accelerator pedal operation amount θacc becomes larger than the predetermined threshold value, during reverse running of the vehicle 10 in the second reverse drive mode, the drive mode setting portion 95 switches the power transmitting system 14 from the second reverse drive mode to the first reverse drive mode. Upon switching from the second reverse drive mode to the first reverse drive mode, the power transmission switching portion 94 commands the brake BR1 to be brought into its released state and commands the clutch CL1 to be brought into its engaged state, so that the rotating speed of the second rotary element RE2 in the form of the first ring gear R1 which has been held stationary is raised to the engine speed Ne. The hybrid control portion 92 commands the engine 12 to increase its output torque after synchronization of the rotating speed of the first ring gear R1 with the engine speed Ne. Namely, the hybrid control portion 92 does not increase the output torque of the engine 12 immediately after an increase of the accelerator pedal operation amount θacc, but increases the engine output torque only after the synchronization of the rotating speed of the first ring gear R1 with the engine speed Ne.

Where the shift lever is switched from the reverse drive position R to the forward drive position D during reverse running of the vehicle 10 in the first reverse drive mode with the drive force of the engine 12, the drive mode setting portion 95 temporarily switches the drive mode from the first reverse drive mode to the second reverse drive mode, and then switches the drive mode from the once established second reverse drive mode to a forward drive mode, so that the drive mode is switched through the second reverse drive mode to the U/D input split HV forward drive sub-mode in which the engine 12 is operated to drive the vehicle 10 in the forward direction. In this case, the clutch CL1 (second coupling element) is kept in the engaged state.

When the drive mode is switched from the motor drive mode (EV drive mode) to the engine drive mode (HV drive mode) during reverse driving of the vehicle 10, the drive mode setting portion 95 selects the first reverse drive mode. In this case, the drive mode is switched from the motor drive mode to the engine drive mode while the second motor/generator MG2 is kept operated in the reverse direction. This manner of control to switch the drive mode permits smooth transition of the source of the vehicle drive force from the second motor/generator MG2 to the engine 12.

Figure 21:
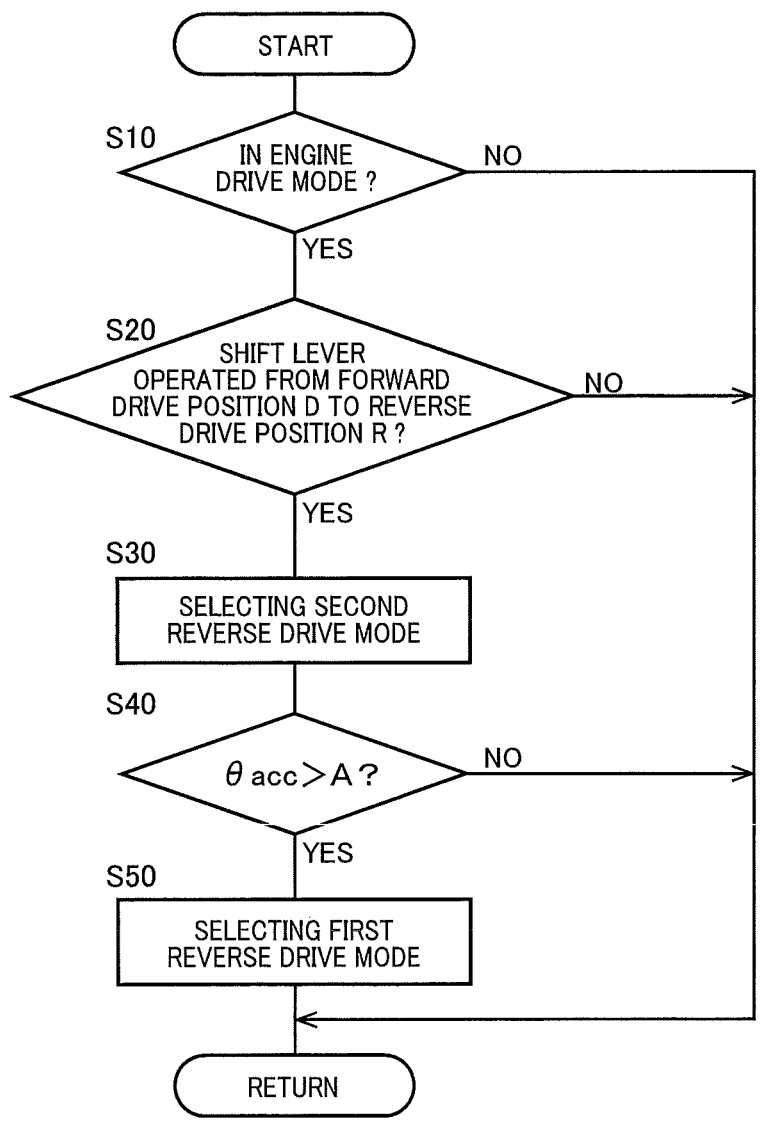
FIG. 21 is a flow chart illustrating major portions of a control operation performed by an electronic control device, namely, a control operation performed during acceleration of the vehicle in the reverse direction with the degree of operation of the accelerator pedal being higher than the threshold value, to switch the drive mode to a first reverse drive mode for reverse driving of the vehicle with reverse input of a large drive force of the engine.
Figure 22:
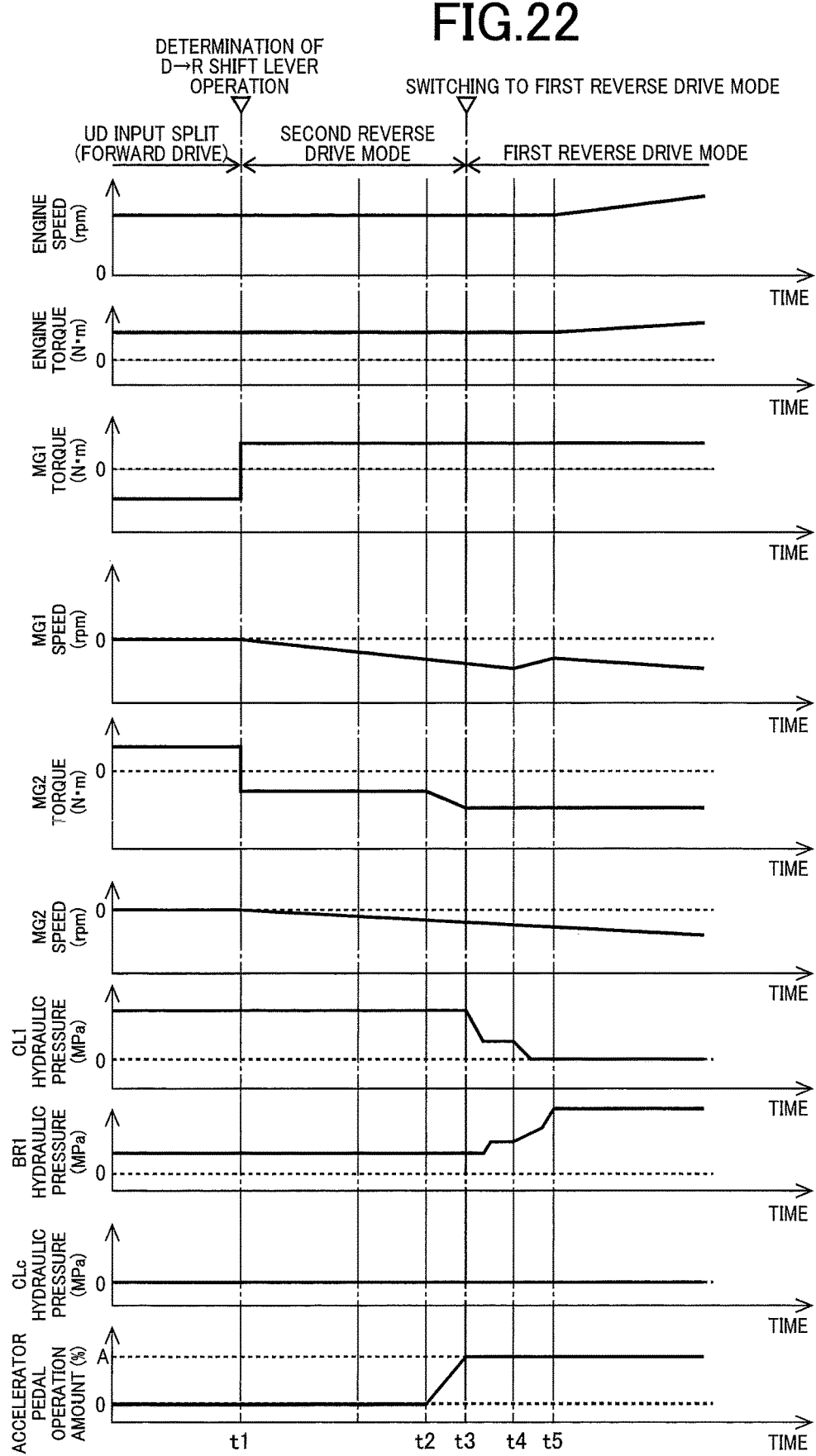
FIG. 22 is a time chart indicating changes of various parameters when the control operation of FIG. 21 is performed.

FIG. 21 is the flow chart illustrating major portions of a control operation performed by the electronic control device 90, namely, a control operation performed during acceleration of the vehicle 10 in the reverse direction in the reverse running with the degree of operation of the accelerator pedal being higher than the threshold value, to switch the drive mode to the first reverse drive mode for reverse driving of the vehicle 10 in which reverse input of the engine 12 is made and a large drive force is obtained. FIG. 22 is the time chart indicating changes of various parameters when the control operation of FIG. 21 is performed.

The control operation of FIG. 21 is initiated with a step S10 corresponding to the hybrid control portion 92, to determine whether the vehicle 10 is running in the engine drive mode, for example, in the U/D input split HV forward drive sub-mode indicated in FIG. 12. If a negative determination is obtained in the step S10, one cycle of execution of the control routine of FIG. 21 is terminated. If an affirmative determination is obtained in the step S10, the control flow goes to a step S20 corresponding to the garage shift operation determining portion 98, to determine whether a garage shift operation of the shift lever has been performed to switch the drive mode of the vehicle 10 from the forward drive position D to the reverse drive position R during running of the vehicle 10 at the running speed V lower than the predetermined value on a flat roadway surface while the accelerator pedal is held in its non-operated position with its operation amount θacc being zero. If a negative determination is obtained in the step S20, one cycle of execution of the control routine of FIG. 21 is terminated. If an affirmative determination is obtained in the step S20, it is determined that the garage shift operation is made and the control flow goes to a step S30 corresponding to the drive mode setting portion 95, to select the second reverse drive mode. In FIG. 22, "t1" represents a point of time at which the second reverse drive mode is selected in the step S30.

In the step S30 in which the second reverse drive mode indicated in FIG. 15 is selected, the hybrid control portion 92 controls the operations of the first motor/generator MG1 and the second motor/generator MG2 while the clutch CL1 is held in the engaged state, so that the vehicle 10 is driven in the reverse direction with a drive force of the engine 12 while the second motor/generator MG2 is operated in the reverse direction. The switching of the drive mode from the U/D input split HV forward drive sub-mode to the second reverse drive mode does not require switching actions of the coupling elements, and can be easily implemented by simply controlling the first motor/generator MG1 and the second motor/generator MG2. In the second reverse drive mode, the brake BR1 is placed in the released state while the clutch CL1 is placed in the engaged state, so that all of the rotary elements of the first differential mechanism 38 are rotated as a unit, and the second motor/generator MG2 connected to the output shaft 24 is operated in the reverse direction.

During the reverse running of the vehicle 10 in the second reverse drive mode, the vehicle operator may initiate an increase of the accelerator pedal operation amount θacc at a point of time t2 indicated in FIG. 22, by way of example, to increase the required vehicle drive force.

The step S30 is followed by a step S40 corresponding to the required vehicle drive force determining portion 96, to determine whether the accelerator pedal operation amount θacc is larger than a predetermined value A (%) above which it is determined that the vehicle operator requires to increase the vehicle drive force. If a negative determination is obtained in the step S40, one cycle of execution of the control routine of FIG. 21 is terminated. If an affirmative determination is obtained in the step S40, the control flow goes to a step S50 corresponding to the drive mode setting portion 95, to switch the reverse drive mode from the second reverse drive mode to the first reverse drive mode. In FIG. 22, "t3" represents a point of time at which the first reverse drive mode is selected.

In the step S40 in which the second reverse drive mode indicated in FIG. 14 is selected, the power transmission switching portion 94 initiates an engaging action of the brake BR1 concurrently with a releasing action of the clutch CL1, and the hybrid control portion 92 operates the first motor/generator MG1 and the second motor/generator MG2 as indicated in FIG. 22. Namely, the rotary motion of the engine 12 is reversed by the first differential mechanism 38, and the reversed rotary motion of the engine 12 is input to the second differential mechanism 40, such that a reverse torque Te of the engine 12 forms a vehicle reverse driving torque with a reverse torque Tg of the first motor/generator MG1 and a reverse torque Tm of the second motor/generator MG2, so that the vehicle 10 is driven with a large reverse drive torque. In FIG. 22, "t4" represents a point of time at which the concurrent releasing and engaging actions of the clutch CL1 and brake BR1 are performed, while "t5" represents a point of time at which the brake BR1 (first coupling element) has been brought into its engaged state so that the reverse drive mode has been switched to the first reverse drive mode. At the point of time t5, the hybrid control portion 92 initiates a control to increase the speed Ne and torque Te of the engine 12.

As described above, the control apparatus in the form of the electronic control device 90 according to the present embodiment for controlling the vehicular power transmitting system 14 is configured such that the drive mode setting portion 95 selects the first reverse drive mode when the required vehicle drive force determining portion 96 has determined that the accelerator pedal operation amount θacc is larger than the predetermined value A. In this first reverse drive mode, the rotary motion of the second rotary element RE2 (first ring gear R1) of the first differential mechanism 38 is stopped as a result of the engaging action of the first coupling element (brake BR1), so that the third rotary element RE3 (first sun gear S1) of the first differential mechanism 38 is rotated in the reverse direction while the first rotary element RE1 (first carrier C1) of the first differential mechanism 38 is rotated in the forward direction. Accordingly, the rotary motion of the engine 12 input to the first rotary element RE1 (first carrier C1) is reversed, and the reversed rotary motion of the engine 12 is output from the third rotary element RE3 (first sun gear S1). Since this third rotary element RE3 (first sun gear S1) is connected to the sixth rotary element RE6 (second ring gear R2) of the second differential mechanism 40, the large reverse drive torque including the output torque of the engine 12 is output from the output shaft 24 connected to the fifth rotary element RE5 (second carrier C2) of the second differential mechanism 40, when the first motor/generator MG1 connected to the fourth rotary element RE4 (second sun gear S2) of the second differential mechanism 40 is controlled so as to generate a negative output torque. The large reverse drive force permits easy reverse uphill running of the vehicle 10.

The electronic control device 90 according to the present embodiment is further configured to control the vehicular power transmitting system 14 which includes the second coupling element in the form of the clutch CL1 for connecting any two elements of the first rotary element RE1 (first carrier C1), the second rotary element RE2 (first ring gear R1) and the third rotary element RE3 (first sun gear S1) of the first differential mechanism 38. The electronic control device 90 includes the garage shift operation determining portion 98 configured to determine whether the garage shift operation of the shift lever has been performed to switch the vehicle drive mode between the forward and reverse drive modes, during running of the vehicle 10 with the drive force of the engine 12 at the running speed V lower than the predetermined value while the accelerator pedal is held in its non-operated position with its operation amount θacc being zero. The drive mode setting portion 95 selects the second reverse drive mode of the vehicle 10 to be established in the engaged state of the second coupling element, when the garage shift operation determining portion 98 has determined that the garage shift operation has been performed. Thus, the second reverse drive mode is established in the engaged state of the second coupling element, when the garage shift operation is performed for switching from the forward drive mode to the reverse drive mode, so that the drive mode can be adequately switched to the reverse drive mode with a higher degree of switching smoothness.

The electronic control device 90 is also configured such that the drive mode setting portion 95 selects the second reverse drive mode when the drive mode is switched from the forward drive mode such as the U/D input split HV forward drive sub-mode to the reverse drive mode during running of the vehicle 10 with the drive force of the engine 12. Accordingly, the drive mode can be easily switched to the reverse drive mode, with a reduced risk of generation of a shifting shock of the power transmitting system 14, since the clutch CL1 is kept in the engaged state.

The electronic control device 90 is further configured such that the required vehicle drive force determining portion 96 determines whether the required drive force of the vehicle 10 obtained (calculated) on the basis of the degree of operation of the accelerator pedal is larger than the predetermined value, and the drive mode setting portion 95 selects the first reverse drive mode when the required vehicle drive force determining portion 96 has determined that the required drive force of the vehicle 10 is larger than the predetermined value. In this case, the first reverse drive mode is selected in a running state of the vehicle 10 in which it is considered that there is a high risk of generation of the shifting shock of the power transmitting system 14.

The electronic control device 90 is further configured such that the hybrid control portion 92 controls the engine 12 such that the output torque of the engine 12 is increased after the engaging action of the first coupling element (brake BR1) is completed when the reverse drive mode of the vehicle 10 is switched from the second reverse drive mode to the first reverse drive mode by the drive mode setting portion 95. Accordingly, the risk of generation of the shifting shock of the power transmitting system 14 upon switching of the reverse drive mode from the second reverse drive mode to the first reverse drive mode can be reduced.

Other embodiments of this invention will be described. It is to be understood that the same reference signs will be used in the following embodiments, to identify the corresponding elements, which will not be described redundantly.

Second Embodiment

Figure 23:
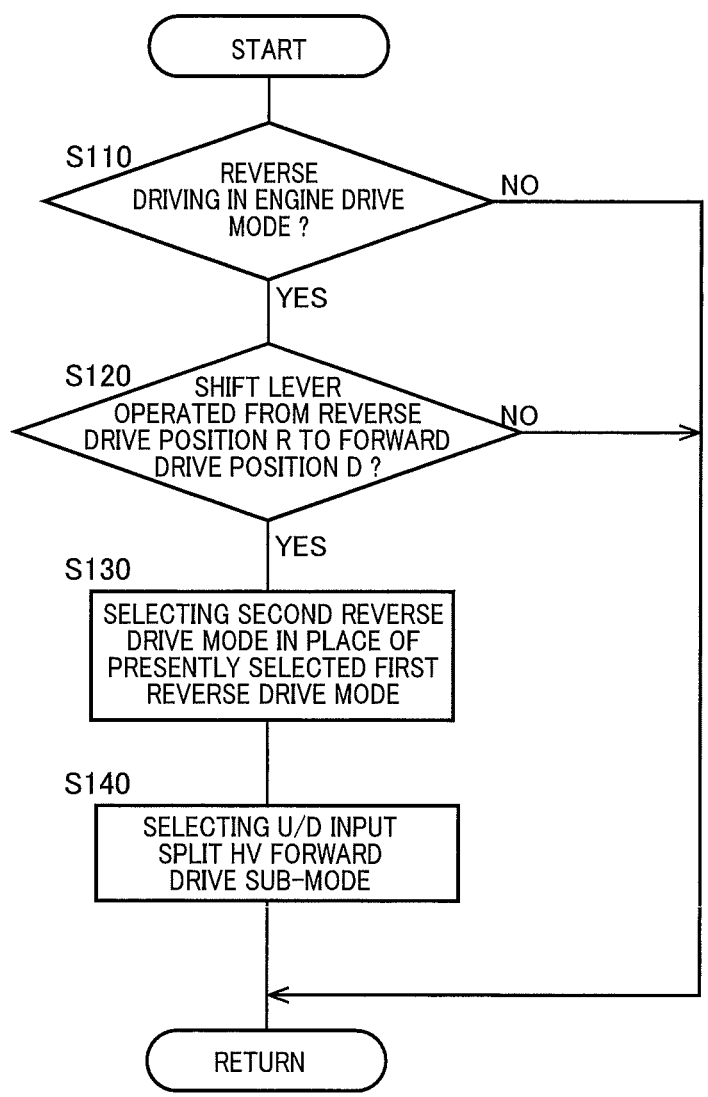
FIG. 23 is a flow chart illustrating major portions of a control operation performed according to another embodiment of this invention.

FIG. 23 is the flow chart illustrating major portions of a control operation performed by the electronic control device 90 according to the present second embodiment. The control operation is initiated with a step S110 to determine whether the vehicle 10 is running in the reverse direction in the engine drive mode. If a negative determination is obtained in the step S110, one cycle of execution of the control routine of FIG. 23 is terminated. If an affirmative determination is obtained in the step S110, the control flow goes to a step S120 to determine whether the shift lever is operated from the reverse drive position R to the forward drive position D. If a negative determination is obtained in the step S120, one cycle of execution of the control routine of FIG. 23 is terminated. If an affirmative determination is obtained in the step S120, the control flow goes to a step S130 corresponding to the drive mode setting portion 95, to temporarily select the second reverse drive mode in place of the presently selected first reverse drive mode. Then, the control flow goes to a step S140 also corresponding to the drive mode setting portion 95, to temporarily select the U/D input split HV forward drive sub-mode.

In the present second embodiment, the vehicular power transmitting system 14 is switched from the first reverse drive mode for reverse driving with the engine 12, to the U/D input split HV forward drive sub-mode, through the second reverse drive mode. Namely, the vehicular power transmitting system 14 is first switched from the first reverse drive mode established in the released state of the brake BR1 and in the engaged state of the clutch CL1, to the second reverse drive mode, and is then switched from the second reverse drive mode to the U/D input split HV forward drive sub-mode while the clutch CL1 is kept in the engaged state. Accordingly, the vehicle drive mode can be easily switched from the first reverse drive mode to the forward engine drive sub-mode, with a reduced risk of generation of the shifting shock of the power transmitting system 14.

Third Embodiment

Figure 24:
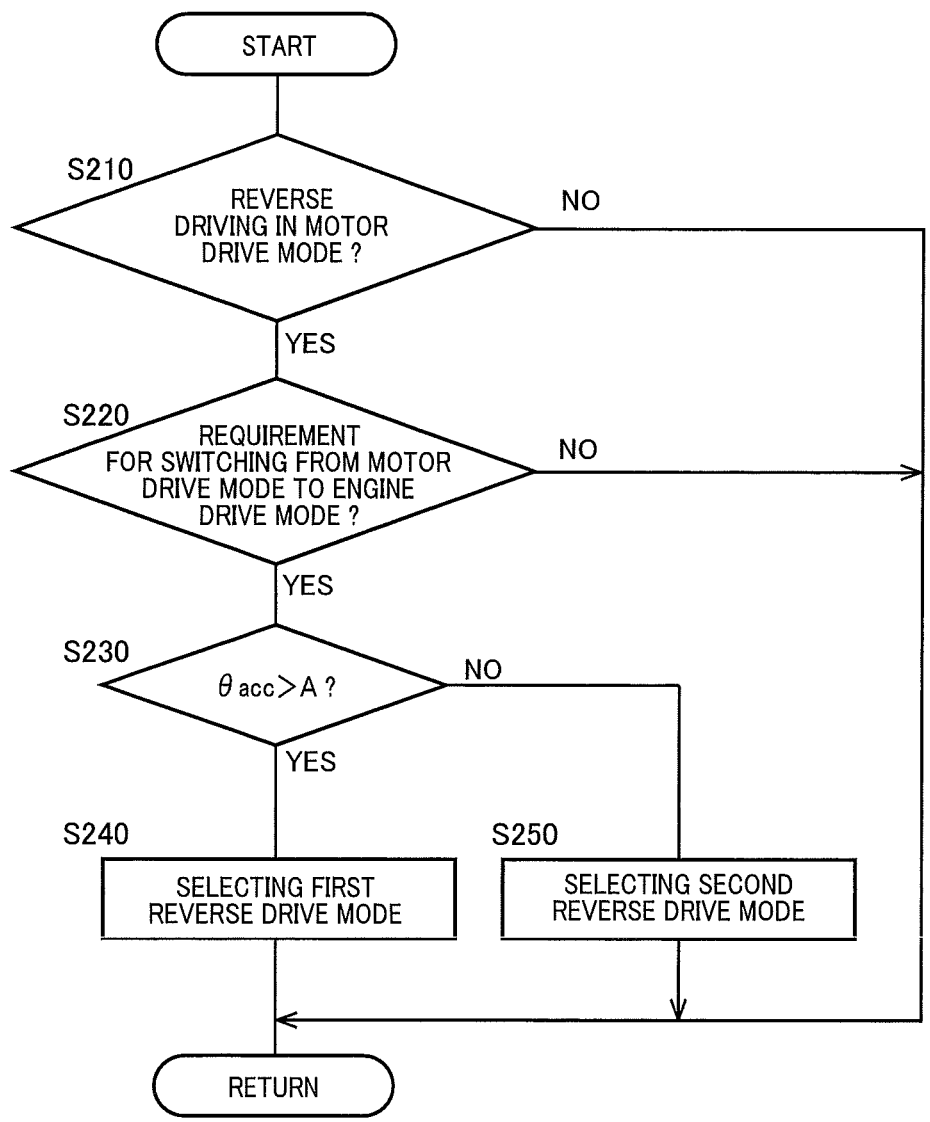
FIG. 24 is a flow chart illustrating major portions of a control operation performed according to a further embodiment of this invention.

FIG. 24 is the flow chart illustrating major portions of a control operation performed by the electronic control device 90 according to the present third embodiment. The control operation is initiated with a step S210 to determine whether the vehicle 10 is running in the reverse direction in the motor drive mode (EV drive mode). If a negative determination is obtained in the step S210, one cycle of execution of the control routine of FIG. 24 is terminated. If an affirmative determination is obtained in the step S210, the control flow goes to a step S220 to determine whether the vehicle drive mode is required to be switched from the motor drive mode to the engine drive mode, as a result of reduction of the electric power amount SOC stored in the battery unit 52. If a negative determination is obtained in the step S220, one cycle of execution of the control routine of FIG. 24 is terminated. If an affirmative determination is obtained in the step S220, the control flow goes to a step S230 to determine whether the operation amount θacc of the accelerator pedal is larger than the predetermined threshold value A. If an affirmative determination is obtained in the step S230, the control flow goes to a step S240 corresponding to the drive mode setting portion 95, to select the first reverse drive mode indicated in FIG. 14. When the vehicle drive mode is switched from the two-motor-drive EV reverse drive sub-mode of FIG. 7 for driving with the first motor/generator MG1 and the second motor/generator MG2, to the engine drive sub-mode, the clutch CL1 is brought into its released state to raise the operating speed of the engine 12 with an operation of the first motor/generator MG1, for ignition and starting of the engine 12. When the vehicle drive mode is switched from the single-motor-drive EV reverse drive sub-mode of FIG. 5 to the engine drive sub-mode, the brake BR1 is brought into its engaged state to raise the operating speed of the engine 12 with an operation of the first motor/generator MG1, for ignition and starting of the engine 12.

If a negative determination is obtained in the step S230, on the other hand, the control flow goes to a step S250 corresponding to the drive mode setting portion 95, to select the second reverse drive mode indicated in FIG. 15. In this second reverse drive mode, the clutch CL1 is placed in the engaged state, and the second motor/generator MG2 is operated in the reverse direction to generate a reverse drive torque. When the vehicle drive mode is switched from the two-motor-drive EV reverse drive sub-mode of FIG. 7 for driving with the first motor/generator MG1 and the second motor/generator MG2, to the engine drive sub-mode, the brake BR1 is brought into its released state to raise the operating speed of the engine 12 with an operation of the first motor/generator MG1, for ignition and starting of the engine 12. When the vehicle drive mode is switched from the single-motor-drive EV reverse drive sub-mode of FIG. 5 to the engine drive sub-mode, relative rotational motions among rotational elements in the first differential mechanism 38 are controlled to be zero by the first motor/generator MG1, then, the clutch CL1 is brought into its engaged state to raise the operating speed of the engine 12 with an operation of the first motor/generator MG1, for ignition and starting of the engine 12.

In the present third embodiment, the reverse drive mode is switched from the motor drive mode to the first reverse drive mode for reverse driving of the vehicle 10 with the drive force of the engine 12 as the engine drive mode for reverse driving of the vehicle 10, while the second motor/generator MG2 is kept operated in the reverse direction. This switching of the reverse drive mode permits smooth transition of the source of the vehicle drive force from the second motor/generator MG2 to the engine 12.

Fourth Embodiment

Figure 25:
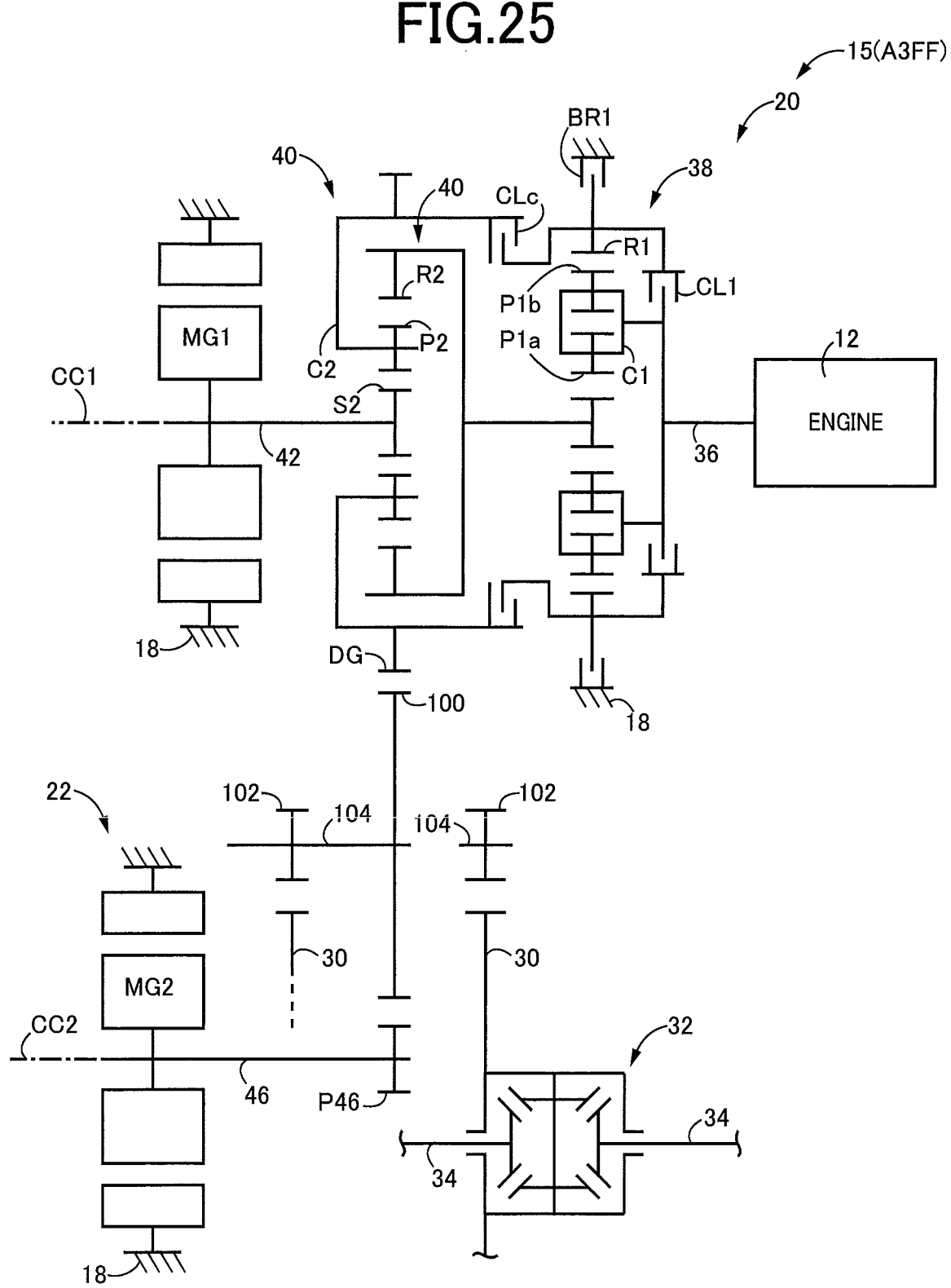
FIG. 25 is a schematic view showing an arrangement of a vehicular power transmitting system having a gear train A3FF according to a still further embodiment of this invention.

FIG. 25 is the schematic view showing an arrangement of a vehicular power transmitting system 15 having a gear train A3FF according to a fourth embodiment of this invention. The gear train A3FF in the present vehicular power transmitting system 15 is different from the gear train A3FR of FIG. 1 in that the gear train A3FF is adapted for use for a vehicle of a front-engine front-drive type while the gear train A2FR is adapted for use for a vehicle of a front-engine rear-drive type. The gear train A3FR of FIG. 1 includes the first motor/generator MG1, the second motor/generator MG2, the first power transmitting portion 20 and the second power transmitting portion 22, which are disposed coaxially with each other. In the gear train A3FF of FIG. 25, the first motor/generator MG1 and the first power transmitting portion 20 are disposed coaxially with a first axis CC1, while the second motor/generator MG2 and the second power transmitting portion 22 are disposed coaxially with a second axis CC2 parallel to the first axis CC1.

The gear train A3FF shown in FIG. 25 is different from the gear train A3FR of FIG. 1 in that the gear train A3FF includes: a drum gear DG connected to the second carrier C2 of the second differential mechanism 40; a second motor/generator output gear P46 fixed to the rotor shaft 46 of the second motor/generator MG2; a counter driven gear 100 meshing with the drum gear DG and the second motor/generator output gear P46; and a counter shaft 104 provided with a counter drive gear 102 meshing with the differential ring gear 30 of the differential gear device 32. In the other aspects, the present gear train A3FF is identical with the gear train A3FR of FIG. 1. The present vehicular power transmitting system 15 has substantially the same operational functions and advantages as the vehicular power transmitting system 14 of the first embodiment shown in FIGS. 1-22.

Fifth Embodiment

Figure 26:
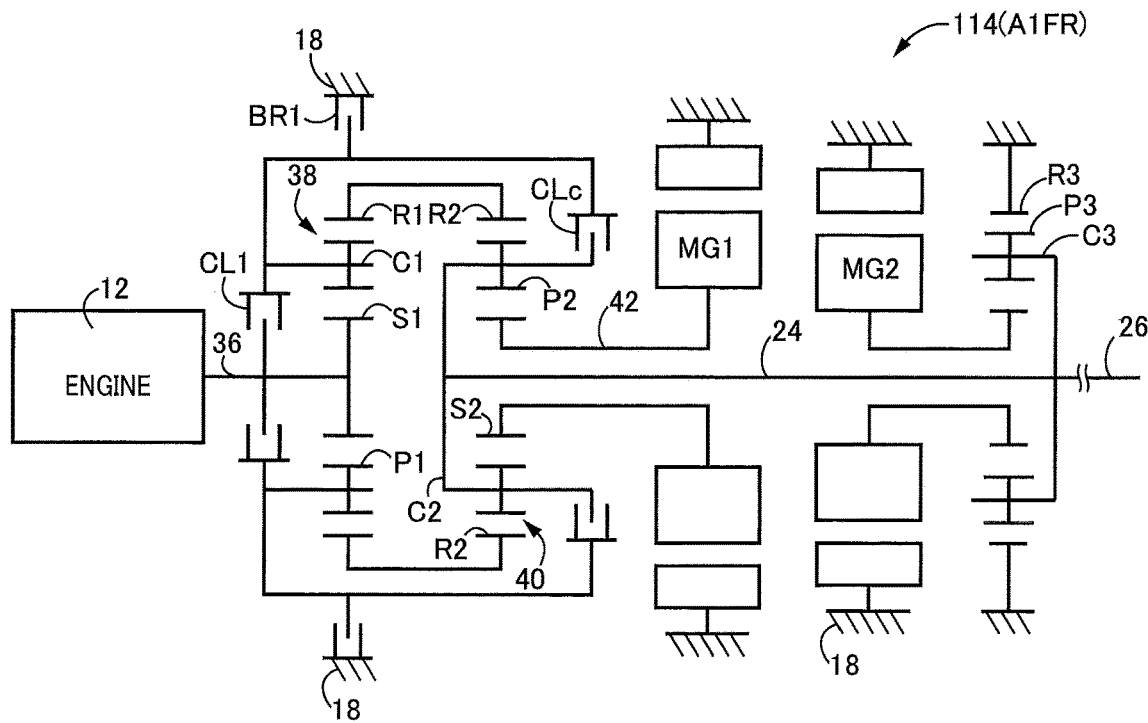
FIG. 26 is a schematic view showing an arrangement of a vehicular power transmitting system having a gear train A1FR according to a yet further embodiment of the invention.
Figure 27:
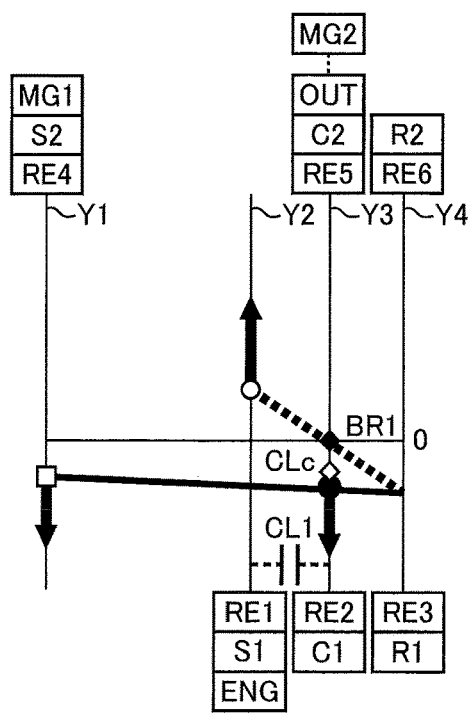
FIG. 27 is a collinear chart indicating the relative rotating speeds of the rotary elements when the gear train A1FR of FIG. 26 is placed in the first reverse drive mode.

FIG. 26 is the schematic view showing an arrangement of a vehicular power transmitting system 114 having a gear train A1FR according to a fifth embodiment of the invention. The present gear train A1FR in the vehicular power transmitting system 114 is similar to the gear train A3FR in the vehicular power transmitting system 14 of FIG. 1 in that the gear train A1FR and the gear train A3FR are adapted for use for the front-engine rear-drive type vehicle. However, the gear train A1FR of FIG. 26 is different from the gear train A3FR of FIG. 1 in that the output of the engine 12 is transmitted to the first sun gear S1 in the first differential mechanism 38 in the gear train A1FR, but is transmitted to the first carrier C1 in the gear train A3FR, and in that the first differential mechanism 38 in the gear train A1FR is a planetary gear mechanism of a single-pinion type. Accordingly, the gear train A1FR of FIG. 26 is different from the gear train A3FR of FIG. 1 in that in the gear train A1FR, the clutch CL1 is disposed between the first sun gear S1 and the first carrier C1, the brake BR1 is disposed between a stationary member in the form of the casing 18 and the first carrier C1, while the clutch CLc is disposed between the first carrier C1 and the second carrier C2. However, the gear train A1FR is identical with the gear train A3FR in the other aspects. The vehicular power transmitting system 114 according to the present fifth embodiment has substantially the same operational functions and advantages as the vehicular power transmitting system 14 of the first embodiment shown in FIGS. 1-22. In the present gear train A1FR, however, the first sun gear S1, the first carrier C1 and the first ring gear R1 of the first differential mechanism 38 respectively correspond to the first, second and third rotary elements RE1, RE2 and RE3. Therefore, the relative rotating speeds of the first sun gear S1, first carrier C1 and first ring gear R1 in the present gear train A1FR are indicated along the respective vertical lines Y2, Y3 and Y4 corresponding to the respective first, second and third rotary elements RE1, RE2 and RE3 in the collinear charts of FIGS. 4-18 as modified such that the first carrier C1 as the first rotary element RE1 is replaced by the first sun gear S1, and the first ring gear R1 as the second rotary element RE2 is replaced by the first carrier C1, while the first sun gear S1 as the third rotary element RE3 is replaced by the first ring gear R1. FIG. 27 is the collinear chart corresponding to that of FIG. 14, indicating the relative rotating speeds of the rotary elements in the first reverse drive mode in the form of the U/D input split HV reverse drive sub-mode.

Sixth Embodiment

Figure 28:
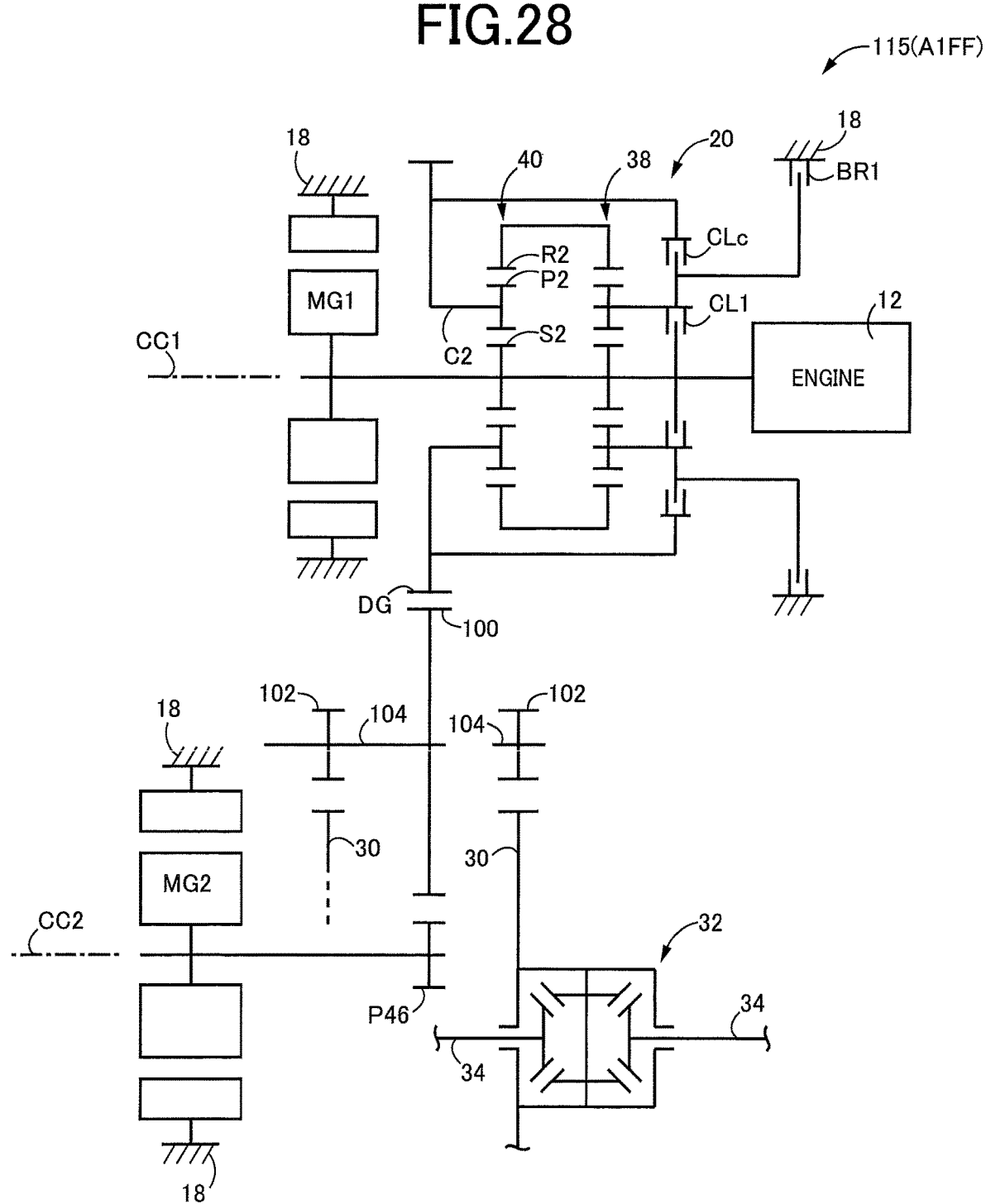
FIG. 28 is a schematic view showing an arrangement of a vehicular power transmitting system having a gear train A1FF according to another embodiment of the invention.

FIG. 28 is the schematic view showing an arrangement of a vehicular power transmitting system 115 having a gear train A1FF according to a sixth embodiment of this invention. The gear train A1FF in the present vehicular power transmitting system 115 is different from the gear train A1FR of FIG. 26 in that the gear train A1FF is adapted for use for a vehicle of a front-engine front-drive type while the gear train A1FR is adapted for use for a vehicle of a front-engine rear-drive type. The gear train A1FR of FIG. 28 includes the first motor/generator MG1, the second motor/generator MG2, the first power transmitting portion 20 and the second power transmitting portion 22, which are disposed coaxially with each other. In the gear train A1FF of FIG. 28, the first motor/generator MG1 and the first power transmitting portion 20 are disposed coaxially with a first axis CC1, while the second motor/generator MG2 and the second power transmitting portion 22 are disposed coaxially with a second axis CC2 parallel to the first axis CC1.

The gear train A1FF shown in FIG. 28 is different from the gear train A1FR of FIG. 26 in that the gear train A1FF includes: a drum gear DG connected to the second carrier C2 of the second differential mechanism 40; a second motor/generator output gear P46 fixed to the rotor shaft 46 of the second motor/generator MG2; a counter driven gear 100 meshing with the drum gear DG and the second motor/generator output gear P46; and a counter shaft 104 provided with a counter drive gear 102 meshing with the differential ring gear 30 of the differential gear device 32. In the other aspects, the present gear train A1FF is identical with the gear train A1FR. The present vehicular power transmitting system 115 has substantially the same operational functions and advantages as the vehicular power transmitting system 114 of the fifth embodiment shown in FIG. 26.

Seventh Embodiment

Figure 29:
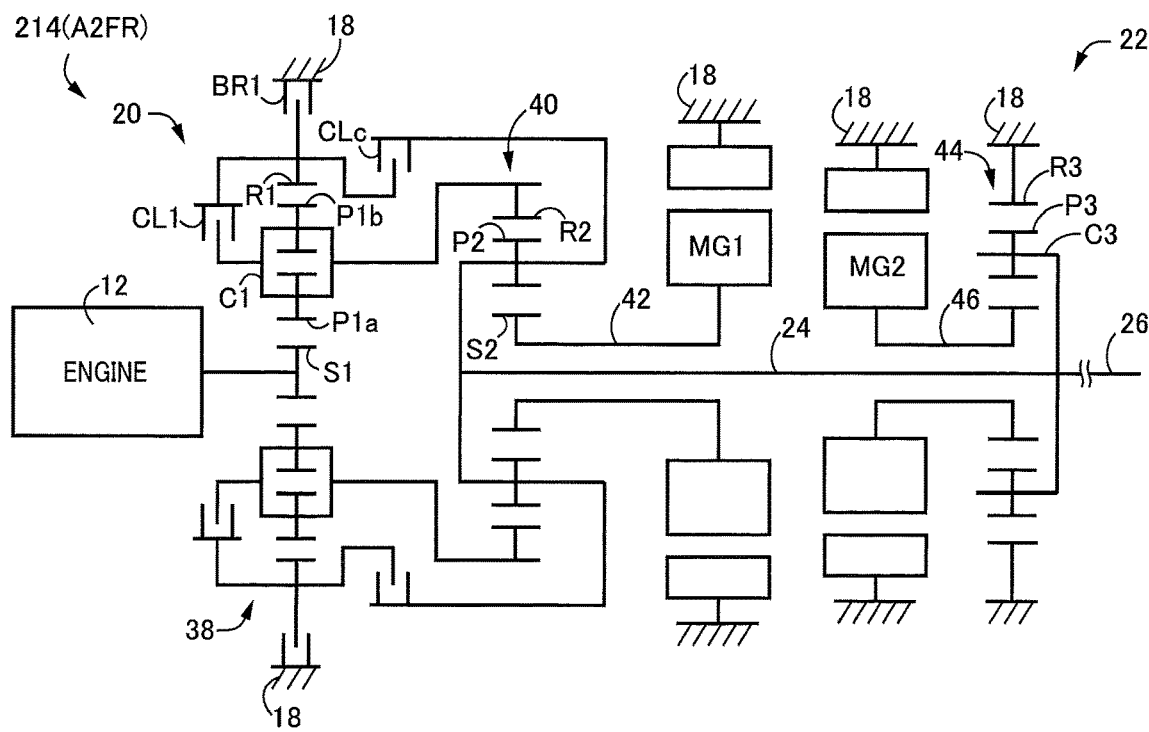
FIG. 29 is a schematic view showing an arrangement of a vehicular power transmitting system having a gear train A2FR according to a still further embodiment of this invention.
Figure 30:
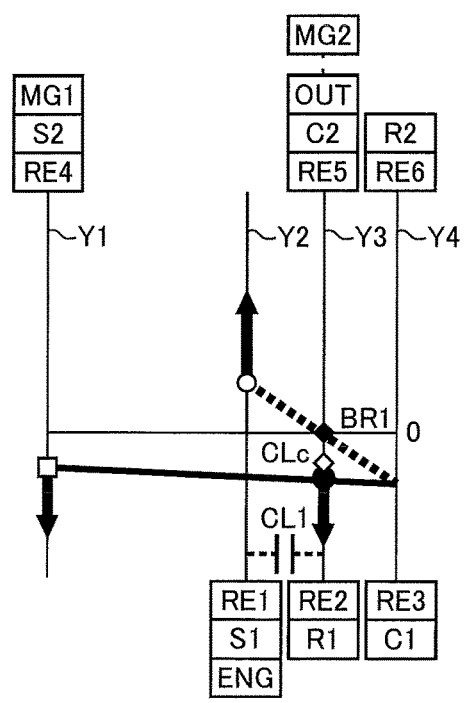
FIG. 30 is a collinear chart indicating the relative rotating speeds of the rotary elements when the gear train A2FR of FIG. 29 is placed in the first reverse drive mode.

FIG. 29 is the schematic view showing an arrangement of a vehicular power transmitting system 214 having a gear train A2FR according to a seventh embodiment of this invention. The present gear train A2FR in the vehicular power transmitting system 214 is similar to the gear train A3FR in the vehicular power transmitting system 14 of FIG. 1 in that the gear train A2FR and the gear train A3FR are adapted for use for the front-engine rear-drive type vehicle. However, the gear train A2FR of FIG. 29 is different from the gear train A3FR of FIG. 1 in that the output of the engine 12 is transmitted to the first sun gear S1 in the first differential mechanism 38 in the gear train A2FR, but is transmitted to the first carrier C1 in the gear train A3FR. In other aspects, the present gear train A2FR is identical with the gear train A3FR. The present vehicular power transmitting system 214 has substantially the same operational functions and advantages as the vehicular power transmitting system 14 of the first embodiment of FIGS. 1-22. In the present gear train A2FR, however, the first sun gear S1, the first ring gear R1 and the first carrier C1 of the first differential mechanism 38 respectively correspond to the first, second and third rotary elements RE1, RE2 and RE3. Therefore, the relative rotating speeds of the first sun gear S1, first ring gear R1 and first carrier C1 in the present gear train A2FR are indicated along the respective vertical lines Y2, Y3 and Y4 corresponding to the respective first, second and third rotary elements RE1, RE2 and RE3 in the collinear charts of FIGS. 4-18 as modified such that the first carrier C1 as the first rotary element RE1 is replaced by the first sun gear S1, and the first sun gear S1 as the third rotary element RE3 is replaced by the first carrier C1. FIG. 30 is the collinear chart indicating the relative rotating speeds of the rotary elements in first reverse drive mode in the form of the U/D input split HV reverse drive sub-mode corresponding to that of FIG. 14.

Eighth Embodiment

Figure 31:
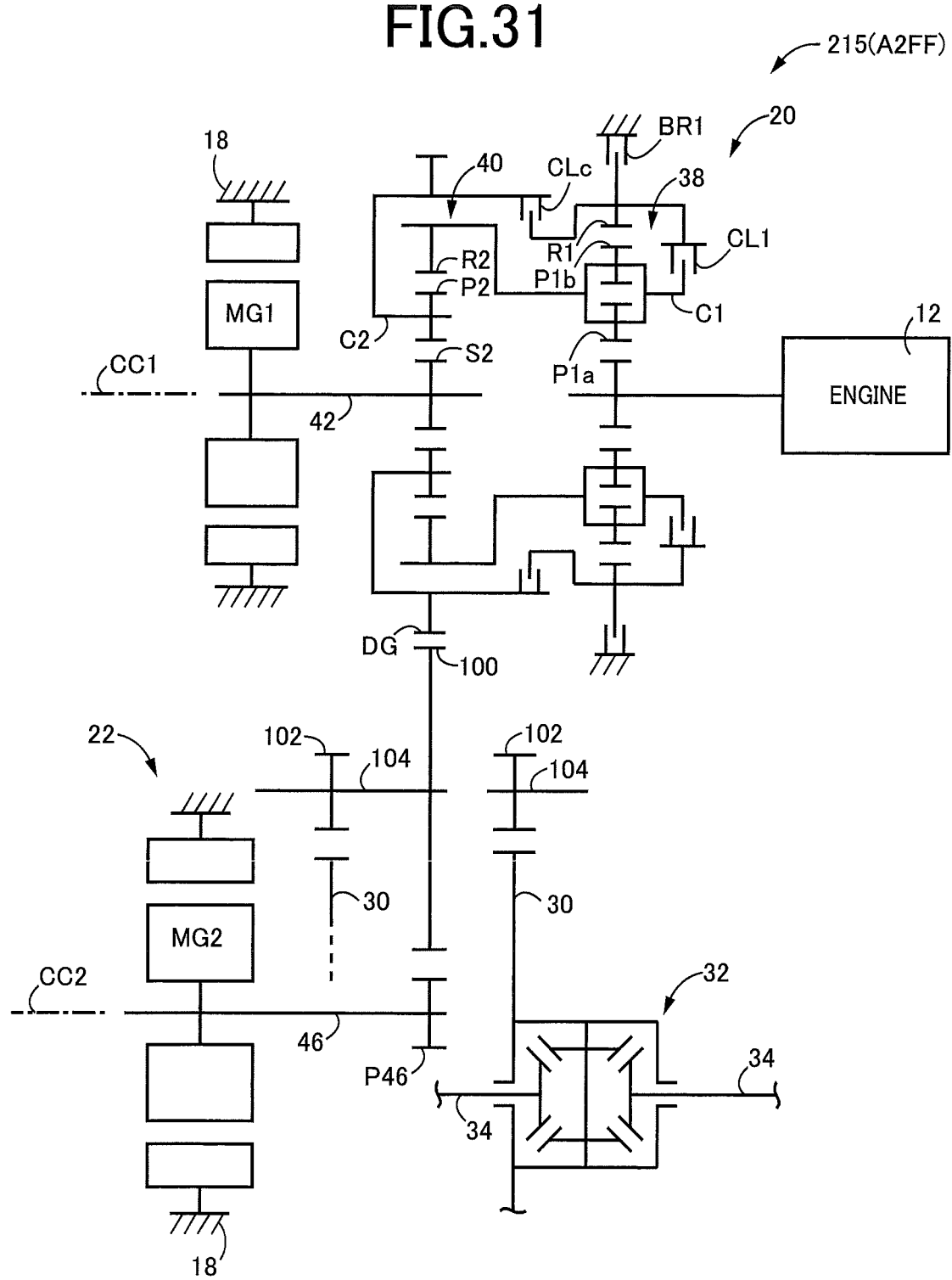
FIG. 31 is a schematic view showing an arrangement of a vehicular power transmitting system having a gear train A2FF according to a yet further embodiment of this invention.

FIG. 31 is the schematic view showing an arrangement of a vehicular power transmitting system 215 having a gear train A2FF according to an eighth embodiment of this invention. The gear train A2FF in the present vehicular power transmitting system 215 is different from the gear train A2FR of FIG. 29 in that the gear train A2FF is adapted for use for a vehicle of a front-engine front-drive type while the gear train A2FR is adapted for use for a vehicle of a front-engine rear-drive type. The gear train A2FR of FIG. 29 includes the first motor/generator MG1, the second motor/generator MG2, the first power transmitting portion 20 and the second power transmitting portion 22, which are disposed coaxially with each other. In the gear train A2FF of FIG. 31, the first motor/generator MG1 and the first power transmitting portion 20 are disposed coaxially with a first axis CC1, while the second motor/generator MG2 and the second power transmitting portion 22 are disposed coaxially with a second axis CC2 parallel to the first axis CC1.

The gear train A2FF shown in FIG. 31 is different from the gear train A2FR of FIG. 29 in that the gear train A2FF includes: a drum gear DG connected to the second carrier C2 of the second differential mechanism 40; a second motor/generator output gear P46 fixed to the rotor shaft 46 of the second motor/generator MG2; a counter driven gear 100 meshing with the drum gear DG and the second motor/generator output gear P46; and a counter shaft 104 provided with a counter drive gear 102 meshing with the differential ring gear 30 of the differential gear device 32. In the other aspects, the present gear train A2FF is identical with the gear train A2FR of FIG. 29. The present vehicular power transmitting system 215 has substantially the same operational functions and advantages as the vehicular power transmitting system 214 of the seventh embodiment shown in FIG. 29.

Ninth Embodiment

Figure 32:
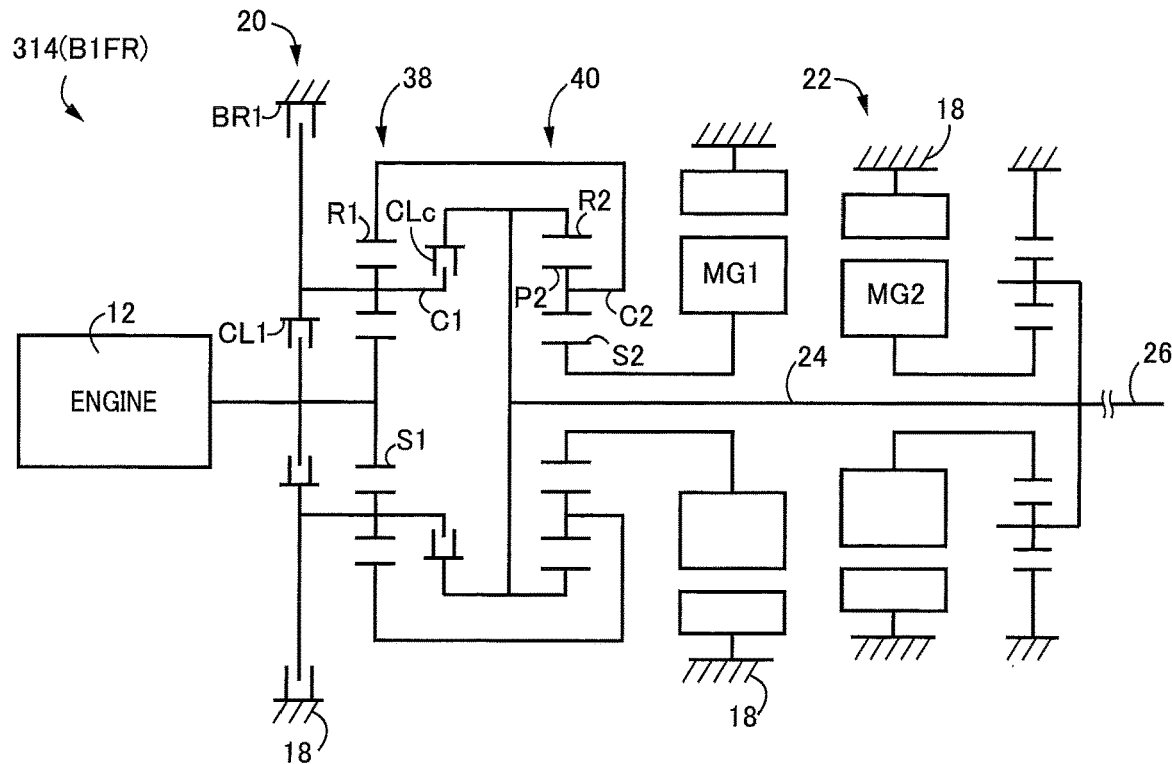
FIG. 32 is a schematic view showing an arrangement of a vehicular power transmitting system having a gear train B1FR according to still another embodiment of the invention.

FIG. 32 is the schematic view showing an arrangement of a vehicular power transmitting system 314 having a gear train B1FR according to a ninth embodiment of the invention. The present gear train B1FR in the vehicular power transmitting system 314 is similar to the gear train A3FR in the vehicular power transmitting system 14 of FIG. 1 in that the gear train B1FR and the gear train A3FR are adapted for use for the front-engine rear-drive type vehicle. However, the gear train B1FR of FIG. 32 is different from the gear train A3FR of FIG. 1 in that the first differential mechanism 38 in the gear train B1FR is a planetary gear mechanism of a single-pinion type, and in that the output of the engine 12 is transmitted to the first sun gear S1 in the first differential mechanism 38 in the gear train B1FR, but is transmitted to the first carrier C1 in the gear train A3FR. Accordingly, the gear train B1FR of FIG. 32 is different from the gear train A3FR of FIG. 1 in that in the gear train B1FR, the clutch CL1 is disposed between the first sun gear S1 and the first carrier C1, the brake BR1 is disposed between a stationary member in the form of the casing 18 and the first carrier C1, while the clutch CLc is disposed between the first carrier C1 and the second ring gear R2, and the second ring gear R2 functions as an output rotary element of the gear train B1FR. The present vehicular power transmitting system 314 has substantially the same operational functions and advantages as the vehicular power transmitting system 14 of the first embodiment of FIGS. 1-22.

Figure 33:
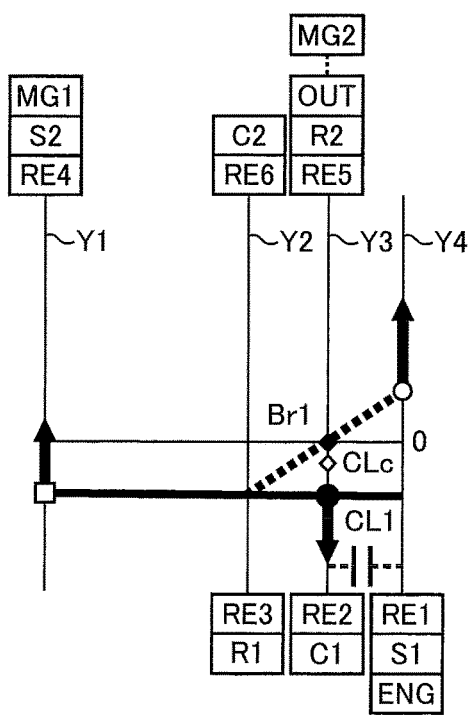
FIG. 33 is a collinear chart indicating the relative rotating speeds of the rotary elements when the gear train B1FR of FIG. 32 is placed in the first reverse drive mode.

In the present gear train B1FR according to the ninth embodiment, the first rotary element RE1 in the form of the first sun gear S1 is connected to the engine 12, the second rotary element RE2 in the form of the first carrier C1 is selectively connected through the clutch CLc to the fifth rotary element RE5 in the form of the second ring gear R2 and the output shaft 24, the third rotary element RE3 in the form of the first ring gear R1 is connected to the sixth rotary element RE6 in the form of the second carrier C2, the fourth rotary element RE4 in the form of the second sun gear S2 is connected to the first motor/generator MG1, and the output shaft 24 is operatively connected to the second motor/generator MG2 in a power transmittable manner. FIG. 33 is the collinear chart indicating the relative rotating speeds of the rotary elements RE1-RE6 in the U/D input split HV drive sub-mode corresponding to that of FIG. 14. FIG. 34 is the table indicating the operating states of the coupling elements in the different sub-modes of the EV and HV drive modes according to the present ninth embodiment. In the power transmitting system 314 according to the present ninth embodiment, the vertical lines Y1, Y2, Y3 and Y4 in the collinear chart of FIG. 33 respectively represent the rotating speed of the fourth rotary element RE4 in the form of the second sun gear S2, the rotating speed of the third and sixth rotary elements RE3 and RE6 in the form of the first ring gear R1 and the second carrier C2, respectively, the rotating speed of the second and fifth rotary elements RE2 and RE5 in the form of the first carrier C1 and the second ring gear R2, respectively, and the rotating speed of the first rotary element RE1 in the form of the first sun gear S1 and the operating speed of the engine 12. The present vehicular power transmitting system 314 is controlled in substantially the same manner as illustrated in FIGS. 21-24, and has substantially the same operational functions and advantages as the vehicular power transmitting system 14 of the first embodiment of FIG. 1.

Tenth Embodiment

Figure 35:
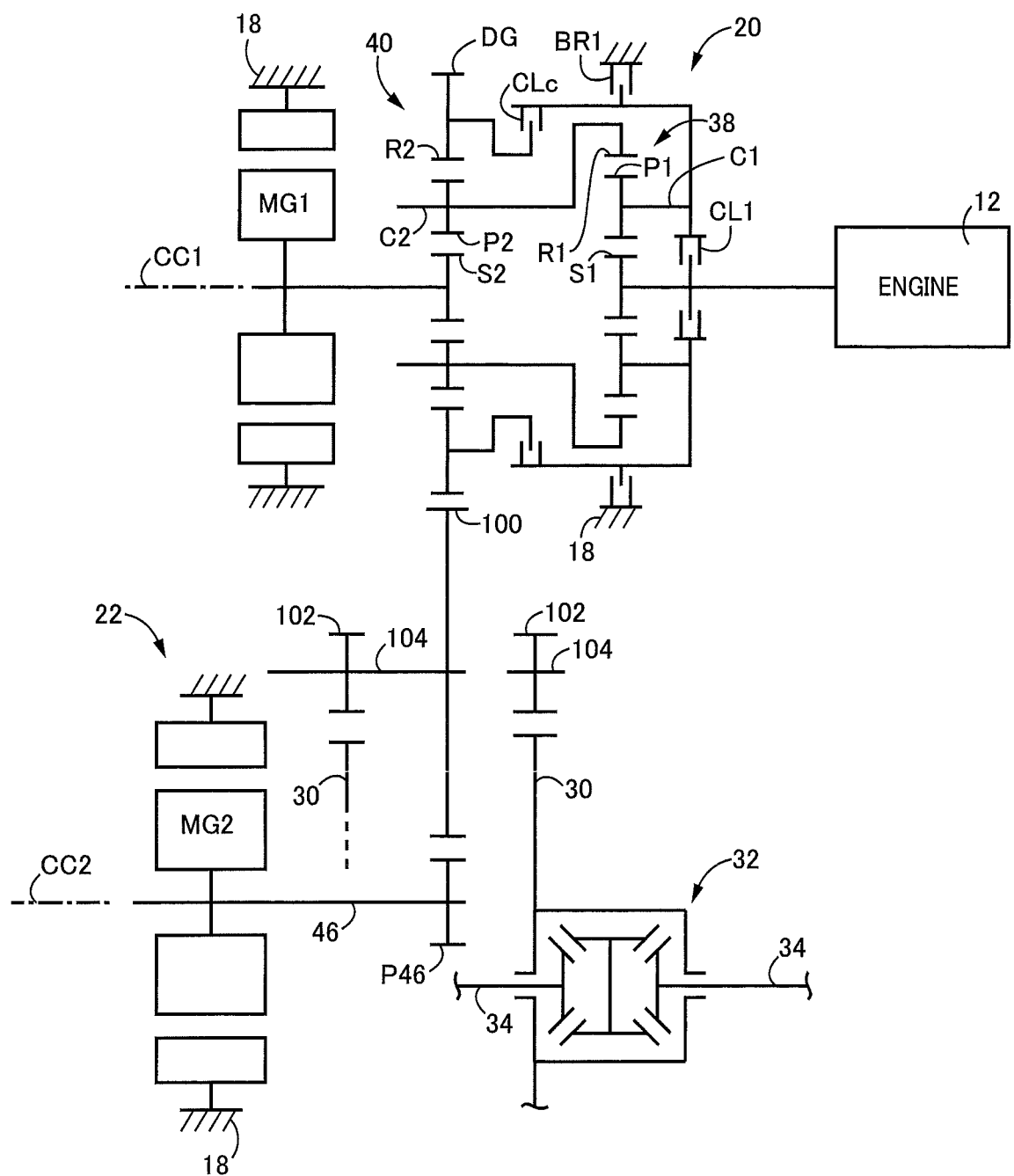
FIG. 35 is a schematic view showing an arrangement of a vehicular power transmitting system having a gear train B1FF according to yet another embodiment of this invention.

FIG. 35 is the schematic view showing an arrangement of a vehicular power transmitting system 315 having a gear train B1FF according to a tenth embodiment of this invention. The gear train B1FF in the present vehicular power transmitting system 315 is different from the gear train B1FR of FIG. 32 in that the gear train B1FF is adapted for use for a vehicle of a front-engine front-drive type while the gear train B1FR is adapted for use for a vehicle of a front-engine rear-drive type. The gear train B1FR of FIG. 32 includes the first motor/generator MG1, the second motor/generator MG2, the first power transmitting portion 20 and the second power transmitting portion 22, which are disposed coaxially with each other. In the gear train B1FF of FIG. 35, the first motor/generator MG1 and the first power transmitting portion 20 are disposed coaxially with a first axis CC1, while the second motor/generator MG2 and the second power transmitting portion 22 are disposed coaxially with a second axis CC2 parallel to the first axis CC1.

The gear train B1FF shown in FIG. 35 is different from the gear train B1FR of FIG. 32 in that the gear train B1FF includes: a drum gear DG connected to the second carrier C2 of the second differential mechanism 40; a second motor/generator output gear P46 fixed to the rotor shaft 46 of the second motor/generator MG2; a counter driven gear 100 meshing with the drum gear DG and the second motor/generator output gear P46; and a counter shaft 104 provided with a counter drive gear 102 meshing with the differential ring gear 30 of the differential gear device 32. In the other aspects, the present gear train B1FF is identical with the gear train B1FR of FIG. 32. The present vehicular power transmitting system 315 has substantially the same operational functions and advantages as the vehicular power transmitting system 314 of the ninth embodiment of FIG. 32.

Eleventh Embodiment

Figure 36:
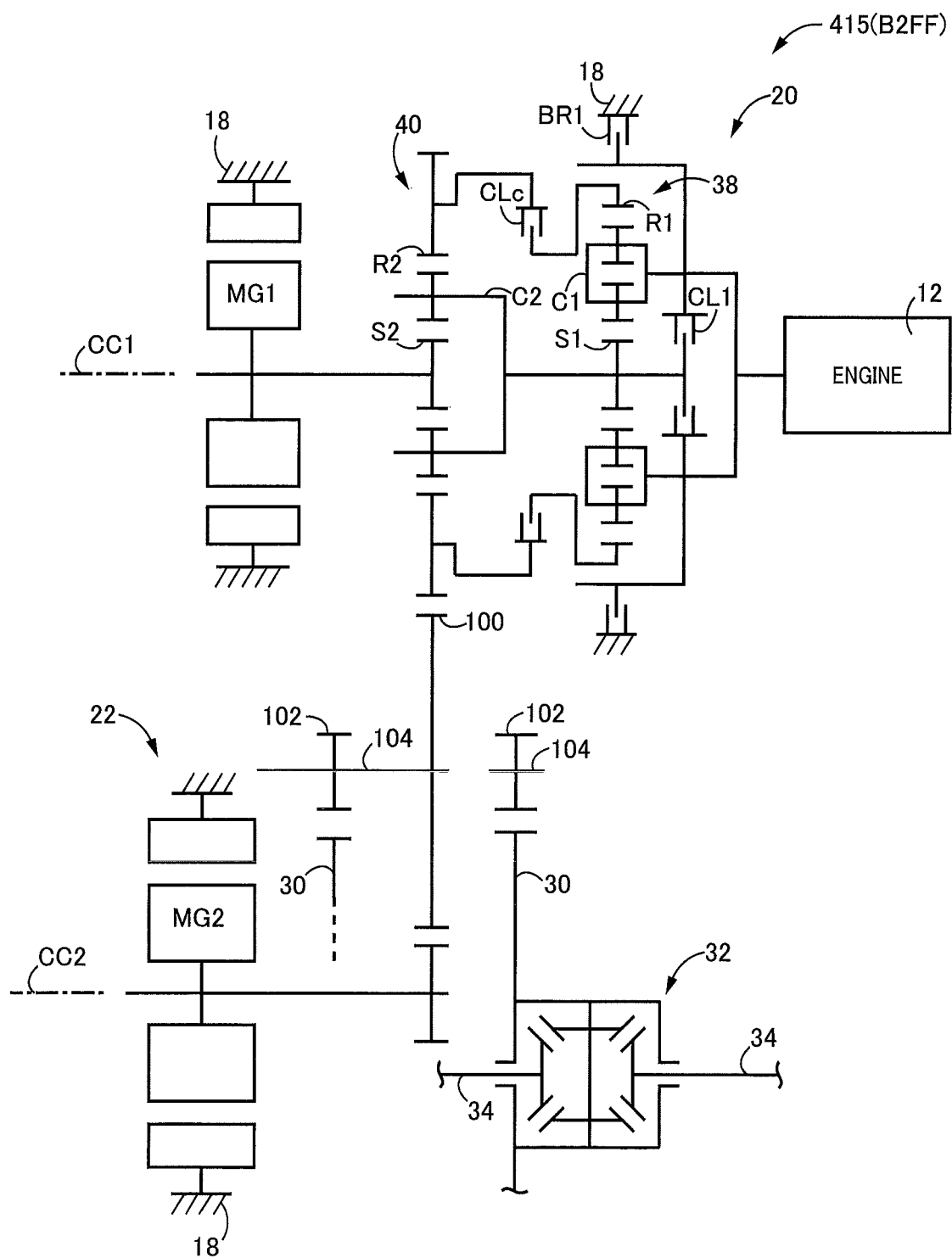
FIG. 36 is a schematic view showing an arrangement of a vehicular power transmitting system having a gear train B2FF according to a further embodiment of the invention.

FIG. 36 is the schematic view showing an arrangement of a vehicular power transmitting system 415 having a gear train B2FF according to an eleventh embodiment of the invention. The gear train B2FF is different from the gear train B1FF in the power transmitting system 315 of FIG. 35 in that the first differential mechanism 38 is a planetary gear mechanism of a double-pinion type and in that the clutch CLc is disposed between the first ring gear R1 and the drum gear DG while the first sun gear S1 is connected to the second carrier C2. In the other aspects, the present gear train B2FF is identical with the gear train B1FF. The present vehicular power transmitting system 415 has substantially the same operational functions and advantages as the vehicular power transmitting system 314 of the ninth embodiment of FIG. 32.

Twelfth Embodiment

Figure 37:
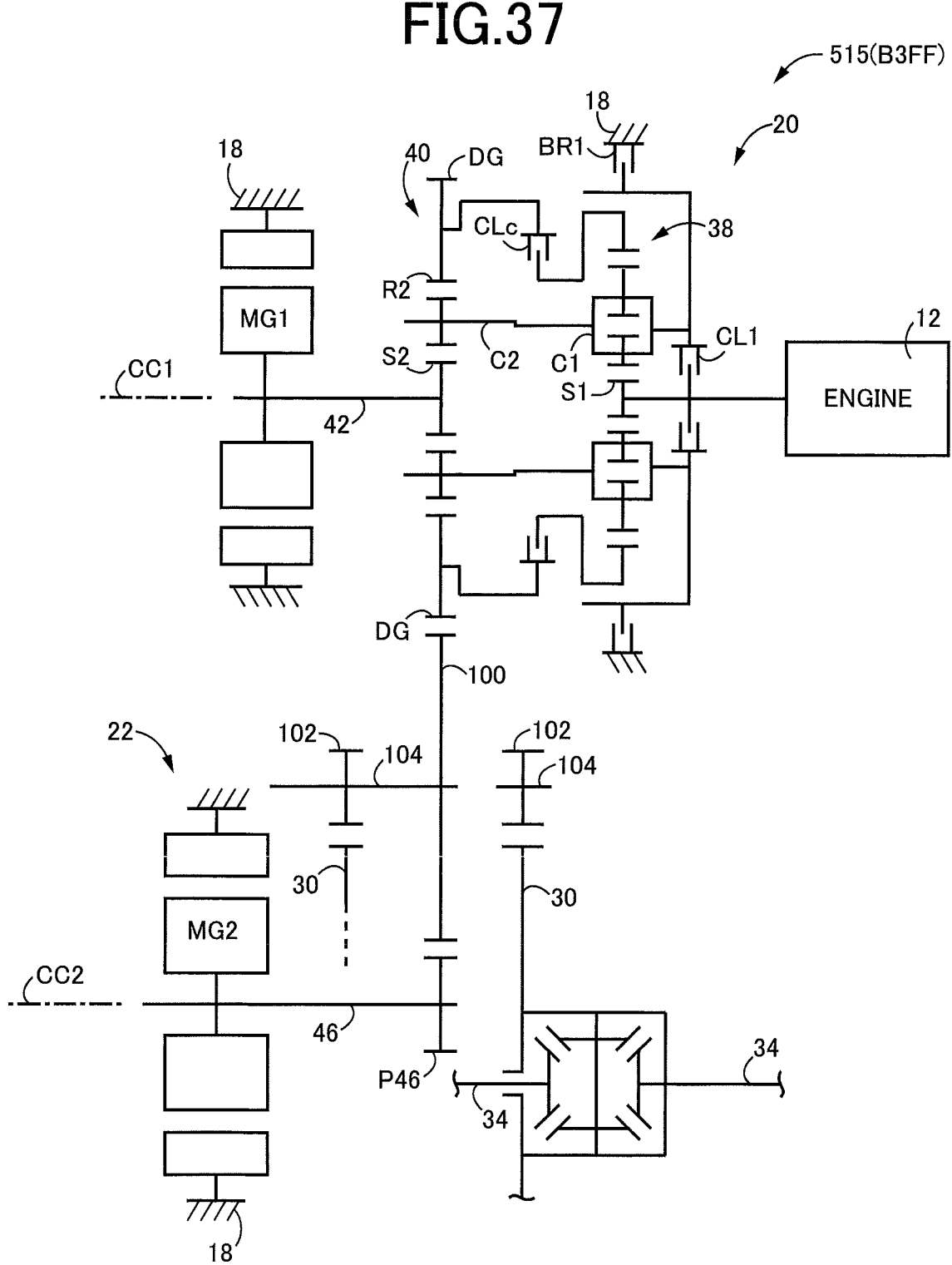
FIG. 37 is a schematic view showing an arrangement of a vehicular power transmitting system having a gear train B3FF according to a still further embodiment of this invention.

FIG. 37 is the schematic view showing an arrangement of a vehicular power transmitting system 515 having a gear train B3FF according to a twelfth embodiment of this invention. The gear train B3FF is different from the gear train B1FF in the power transmitting system 315 of FIG. 35 in that the first differential mechanism 38 is a planetary gear mechanism of a double-pinion type and in that the clutch CLc is disposed between the first ring gear R1 and the drum gear DG while the first carrier C1 and the second carrier C2 are connected to each other. In the other aspects, the present gear train B3FF is identical with the gear train B1FF. The present vehicular power transmitting system 515 has substantially the same operational functions and advantages as the vehicular power transmitting system 314 of the ninth embodiment of FIG. 32.

While the preferred embodiments of the invention have been described by reference to the drawings, the present invention may be otherwise embodied.

In the illustrated embodiments, the brake BR1 is used as the first coupling element for selectively connecting the second rotary element RE2 to the stationary member in the form of the casing 18. However, the first coupling element may be any other coupling element as long as the first coupling element is provided to selectively connect an intermediate one of the rotary elements RE1, RE2 and RE3 as seen in the collinear chart, to the stationary member.

The illustrated embodiments wherein the clutch CL1 is provided as the second coupling element for selectively connecting the first rotary element RE1 and the second rotary element RE2 to each other may be modified, for example, such that the second coupling element may be a clutch for selectively connecting the second and third rotary elements RE2 and RE3 to each other, or a clutch for selectively connecting the first and third rotary elements RE1 and RE3 to each other. Any other modification may be made as long as the second coupling element is a clutch for selectively connecting any two elements of the first, second and third rotary elements RE1, RE2 and RE3, to each other.

In the illustrated embodiments, the second differential mechanism 40 is a planetary gear mechanism of a single-pinion type. However, the second differential mechanism 40 may be replaced by a planetary gear mechanism of a double-pinion type. Accordingly, the relationship between the first sun gear S1, first carrier C1 and first ring gear R1, and the first, second and third rotary elements RE1, RE2 and RE3 in the first differential mechanism 38, and the relationship between the second sun gear S2, second carrier C2 and second ring gear R2, and the fourth, fifth and sixth rotary elements RE4, RE5 and RE6 in the second differential mechanism 40 are not limited to those in the illustrated embodiments.

In the illustrated embodiments, the clutch CL1, brake BR1 and clutch CLc provided as the coupling elements are hydraulically operated wet-type frictional coupling devices. However, the coupling elements may be electrically controlled coupling devices.

While the preferred embodiments and their modifications have been described for illustrative purpose only, it is to be understood that the present invention may be embodied with various changes and improvements, which may occur to those skilled in the art.

NOMENCLATURE OF ELEMENTS

10: Vehicle
12: Engine
16: Drive wheels
24: Output shaft (Output rotary member)
38: First differential mechanism
C1: First carrier (Rotary element)
R1: First ring gear (Rotary element)
S1: First sun gear (Rotary element)
40: Second differential mechanism
S2: Second sun gear (Rotary element)

C2: Second carrier (Rotary element)
R2: Second ring gear (Rotary element)
90: Electronic control device (Control apparatus)
92: Hybrid control portion
95: Drive mode setting portion
96: Required vehicle drive force determining portion
98: Garage shift operation determining portion
BR1: Brake (First coupling element)
CL1: Clutch (Second coupling element)
CLc: Clutch
MG1: First motor/generator
MG2: Second motor/generator

What is claimed is:

1. A control apparatus for a power transmitting system of a vehicle including: a first differential mechanism having a first rotary element, a second rotary element and a third rotary element; a second differential mechanism having a fourth rotary element, a fifth rotary element and a sixth rotary element; and a first coupling element for connecting the second rotary element and a stationary member to each other, and wherein the first rotary element is connected to an engine, the third rotary element is connected to the sixth rotary element, the fifth rotary element is connected to an output shaft, the fourth rotary element is connected to a first motor/generator, and the output shaft is connected to a second motor/generator, the control apparatus comprising:
a required vehicle drive force determining portion configured to determine whether a degree of operation of an accelerator pedal of the vehicle during reverse driving of the vehicle is higher than a predetermined threshold value; and
a drive mode setting portion configured to select a first reverse drive mode of the vehicle to be established in an engaged state of the first coupling element, when the required vehicle drive force determining portion has determined that the degree of operation of the accelerator pedal during the reverse driving of the vehicle is higher than the predetermined threshold value.

2. The control apparatus according to claim 1, wherein the degree of operation of the accelerator pedal is represented by an amount of operation of the accelerator pedal, a rate of change of the amount of operation of the accelerator pedal, and an amount of change of the operation amount of the accelerator pedal.

3. The control apparatus according to claim 1, wherein the power transmitting system further includes a second coupling device for connecting any two elements of the first, second and third rotary elements to each other, the control apparatus further comprising:

a garage shift operation determining portion configured to determine whether a garage shift operation of a shift lever has been performed to switch a drive mode of the vehicle between forward and reverse drive modes, during running of the vehicle with a drive force of the engine at a running speed lower than a predetermined value while the accelerator pedal is held in its non-operated position,
and wherein the drive mode setting portion selects a second reverse drive mode of the vehicle to be established in an engaged state of the second coupling element, when the garage shift operation determining portion determines that the garage shift operation has been performed.

4. The control apparatus according to claim 3, wherein the drive mode setting portion selects the second reverse drive mode when the drive mode is switched from the forward drive mode to the reverse drive mode during the running of the vehicle with the drive force of the engine.

5. The control apparatus according to claim 3, further comprising a hybrid control portion configured to control the engine such that an output torque of the engine is increased after an engaging action of the first coupling element is completed when a reverse drive mode of the vehicle is switched from the second reverse drive mode to the first reverse drive mode by the drive mode setting portion.

6. The control apparatus according to claim 3, wherein the drive mode setting portion switches a drive mode of the vehicle from the first reverse drive mode for reverse driving of the vehicle with the drive force of the engine, to a forward drive mode for forward driving of the vehicle with the drive force of the engine, through the second reverse drive mode.

7. The control apparatus according to claim 1, wherein the required vehicle drive force determining portion determines whether a required drive force of the vehicle obtained on the basis of the degree of operation of the accelerator pedal is larger than a predetermined value, and the drive mode setting portion selects the first reverse drive mode when the required vehicle drive force determining portion has determined that the required drive force of the vehicle is larger than the predetermined value.

8. The control apparatus according to claim 1, further comprising a power transmission switching portion configured to establish the first reverse drive mode selected by the drive mode setting portion.

* * * * *